US012632044B2

(12) United States Patent
Idomoto et al.

(10) Patent No.: US 12,632,044 B2
(45) Date of Patent: May 19, 2026

(54) WORK MANAGEMENT DEVICE AND WORK MANAGEMENT METHOD

(71) Applicant: Kubota Corporation, Osaka (JP)

(72) Inventors: Yasushi Idomoto, Amagasaki (JP); Hayato Kageyama, Amagasaki (JP); Kazuya Ito, Tokyo (JP); Kazuma Harada, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 340 days.

(21) Appl. No.: 18/257,460

(22) PCT Filed: Nov. 29, 2021

(86) PCT No.: PCT/JP2021/043521
§ 371 (c)(1),
(2) Date: Jun. 14, 2023

(87) PCT Pub. No.: WO2022/137988
PCT Pub. Date: Jun. 30, 2022

(65) Prior Publication Data
US 2024/0012396 A1      Jan. 11, 2024

(30) Foreign Application Priority Data
Dec. 21, 2020 (JP) ................................. 2020-211811

(51) Int. Cl.
*G05B 19/418* (2006.01)
*G06T 7/70* (2017.01)

(52) U.S. Cl.
CPC ... *G05B 19/41865* (2013.01); *G05B 19/4184* (2013.01); *G06T 7/70* (2017.01)

(58) Field of Classification Search
CPC .. G05B 19/41865; G05B 19/4184; G06T 7/70
(Continued)

(56) References Cited

U.S. PATENT DOCUMENTS

2005/0278049 A1* 12/2005 Van Den Nieuwelaar ..................
G05B 19/41865
700/100
2017/0308842 A1* 10/2017 Tsuzuki ......... G06Q 10/063112
(Continued)

FOREIGN PATENT DOCUMENTS

CN       110930377 A       3/2020
CN       111553265 A       8/2020
(Continued)

OTHER PUBLICATIONS

International Search Report and Written Opinion and English translation thereof dated Feb. 15, 2022.
(Continued)

*Primary Examiner* — Md Azad
(74) *Attorney, Agent, or Firm* — Harness, Dickey & Pierce, P.L.C.

(57) ABSTRACT
It is possible to precisely manage a task in operation by precisely inferring the task with use of a trained model that is constructed by machine learning. A task management device (3) includes: a first outputting section (312) configured to output a detection class that is inferred to appear in a task at a time point at which a captured image is obtained, the detection class being inferred by inputting the captured image to an index inference model (321); and a task inferring section (314) configured to infer, on the basis of an output result from the first outputting section, the task being carried out at the time point at which the captured image is obtained.

12 Claims, 7 Drawing Sheets

(58) Field of Classification Search
USPC ......................................................... 700/100
See application file for complete search history.

(56)                           References Cited

U.S. PATENT DOCUMENTS

| | | | |
|---|---|---|---|
| 2019/0228495 A1* | 7/2019 | Tremblay ............... | B25J 9/1661 |
| 2020/0117201 A1* | 4/2020 | Oetken ................ | G05D 1/0231 |
| 2020/0151833 A1 | 5/2020 | Bellaish et al. | |
| 2021/0216075 A1* | 7/2021 | Takaoka ............... | G05D 1/0274 |
| 2022/0237533 A1* | 7/2022 | Imai ........................... | G06T 7/70 |

FOREIGN PATENT DOCUMENTS

| | | |
|---|---|---|
| JP | 2017-107443 A | 6/2017 |
| JP | 2018-169933 A | 11/2018 |
| JP | 6539772 B1 | 7/2019 |
| JP | 2019-148946 A | 9/2019 |
| JP | 2020-004096 A | 1/2020 |
| JP | 2020-060993 A | 4/2020 |
| JP | 2020-107341 A | 7/2020 |
| TW | 201901366 A | 1/2019 |
| WO | 2019/163329 A1 | 8/2019 |
| WO | 2020/241043 A1 | 12/2020 |

OTHER PUBLICATIONS

Ma Meng et al: "Deep-Convolution-Based LSTM Network for Remaining Useful Life Prediction", IEEE Transactions on Industrial Informatics, IEEE Service Center, New York, NY, US, vol. 17, No. 3, May 7, 2020 (May 7, 2020), pp. 1658-1667, XP011825144, ISSN: 1551-3203, DOI: 10.1109/TII.2020.2991796 [retrieved on Dec. 3, 2020] * pp. 1,45 *.

Extended European Search Report for European Application No. 21910140.9 mailed Jan. 15, 2025.

European Partial Search Report for European Application No. 21910140.9 mailed Oct. 23, 2024.

Japanese Notice of Allowance and English translation thereof for Japanese Application No. 2024-177890 mailed Aug. 5, 2025.

Office Action dated Feb. 12, 2026 issued in Taiwanese patent application No. 110145983.

Office Action dated Feb. 18, 2026 issued in Indian patent application No. 202317046119.

* cited by examiner

301

| TASK STEP | TASK STATE | | |
| | TASK PROCEDURE | SAFETY | TIME |
| --- | --- | --- | --- |
| JOINING | NORMAL | NORMAL | NORMAL |
| | ABNORMAL | ABNORMAL | ABNORMAL |

TIME PERIOD

| TASK STEP | 8:00 | 9:00 | 10:00 | 11:00 | 12:00 | 13:00 | 14:00 | 15:00 | 16:00 | 17:00 |
|---|---|---|---|---|---|---|---|---|---|---|
| CUT ASPHALT | | | | | | | | | | |
| EXCAVATE ASPHALT | | | | | | | | | | |
| EXCAVATE WITH MACHINE | | | | | | | | | | |
| MANUALLY EXCAVATE | | | | | | | | | | |
| LIFT AND INSTALL PIPE | | | | | | | | | | |
| CONNECT FITTINGS | | | | | | | | | | |
| COMPACT MOUNTAIN SAND | | | | | | | | | | |
| CONSTRUCT LOWER SUBBASE | | | | | | | | | | |
| CONSTRUCT UPPER SUBBASE | | | | | | | | | | |
| LAY ASPHALT | | | | | | | | | | |

Tp
Tq
Tr

···TASK SCHEDULE

···ACTUAL TASK PERFORMANCE

FIG. 6

| TASK PROCEDURE | TASK QUALITY | SAFETY | TASK TIME PERIOD (COMPARISON WITH EXECUTION PLAN) | CONTENT OF NOTIFICATION |
|---|---|---|---|---|
| CORRECT | GOOD | SAFE | SHORT | PROPOSE TO SHORTEN TASK TIME PERIOD AND DISTRIBUTE MANPOWER ETC. |
| CORRECT | GOOD | SAFE | STANDARD | NONE |
| CORRECT | GOOD | SAFE | LONG | PROPOSE TO LENGTHEN TASK TIME PERIOD AND ALLOCATE ADDITIONAL MANPOWER ETC. |
| CORRECT | GOOD | DANGEROUS | SHORT | WARN AS DANGEROUS TASK AND PROPOSE IMPROVEMENT METHOD |
| CORRECT | GOOD | DANGEROUS | STANDARD | WARN AS DANGEROUS TASK AND PROPOSE IMPROVEMENT METHOD |
| CORRECT | GOOD | DANGEROUS | LONG | WARN AS DANGEROUS TASK AND PROPOSE IMPROVEMENT METHOD |
| CORRECT | POOR | SAFE | SHORT | INSTRUCT READJUSTMENT OF TASK |
| CORRECT | POOR | SAFE | STANDARD | INSTRUCT READJUSTMENT OF TASK |
| CORRECT | POOR | SAFE | LONG | INSTRUCT READJUSTMENT OF TASK |
| CORRECT | POOR | DANGEROUS | SHORT | WARN AS DANGEROUS TASK, PROPOSE IMPROVEMENT METHOD, AND INSTRUCT READJUSTMENT OF TASK |
| CORRECT | POOR | DANGEROUS | STANDARD | WARN AS DANGEROUS TASK, PROPOSE IMPROVEMENT METHOD, AND INSTRUCT READJUSTMENT OF TASK |
| CORRECT | POOR | DANGEROUS | LONG | WARN AS DANGEROUS TASK, PROPOSE IMPROVEMENT METHOD, AND INSTRUCT READJUSTMENT OF TASK |
| INCORRECT | GOOD | SAFE | SHORT | INSTRUCT READJUSTMENT OF TASK |
| INCORRECT | GOOD | SAFE | STANDARD | INSTRUCT READJUSTMENT OF TASK |
| INCORRECT | GOOD | SAFE | LONG | INSTRUCT READJUSTMENT OF TASK |
| INCORRECT | GOOD | DANGEROUS | SHORT | WARN AS DANGEROUS TASK, PROPOSE IMPROVEMENT METHOD, AND INSTRUCT READJUSTMENT OF TASK |
| INCORRECT | GOOD | DANGEROUS | STANDARD | WARN AS DANGEROUS TASK, PROPOSE IMPROVEMENT METHOD, AND INSTRUCT READJUSTMENT OF TASK |
| INCORRECT | GOOD | DANGEROUS | LONG | WARN AS DANGEROUS TASK, PROPOSE IMPROVEMENT METHOD, AND INSTRUCT READJUSTMENT OF TASK |
| INCORRECT | POOR | SAFE | SHORT | INSTRUCT READJUSTMENT OF TASK |
| INCORRECT | POOR | SAFE | STANDARD | INSTRUCT READJUSTMENT OF TASK |
| INCORRECT | POOR | SAFE | LONG | INSTRUCT READJUSTMENT OF TASK |
| INCORRECT | POOR | DANGEROUS | SHORT | WARN AS DANGEROUS TASK, PROPOSE IMPROVEMENT METHOD, AND INSTRUCT READJUSTMENT OF TASK |
| INCORRECT | POOR | DANGEROUS | STANDARD | WARN AS DANGEROUS TASK, PROPOSE IMPROVEMENT METHOD, AND INSTRUCT READJUSTMENT OF TASK |
| INCORRECT | POOR | DANGEROUS | LONG | WARN AS DANGEROUS TASK, PROPOSE IMPROVEMENT METHOD, AND INSTRUCT READJUSTMENT OF TASK |

FIG. 7

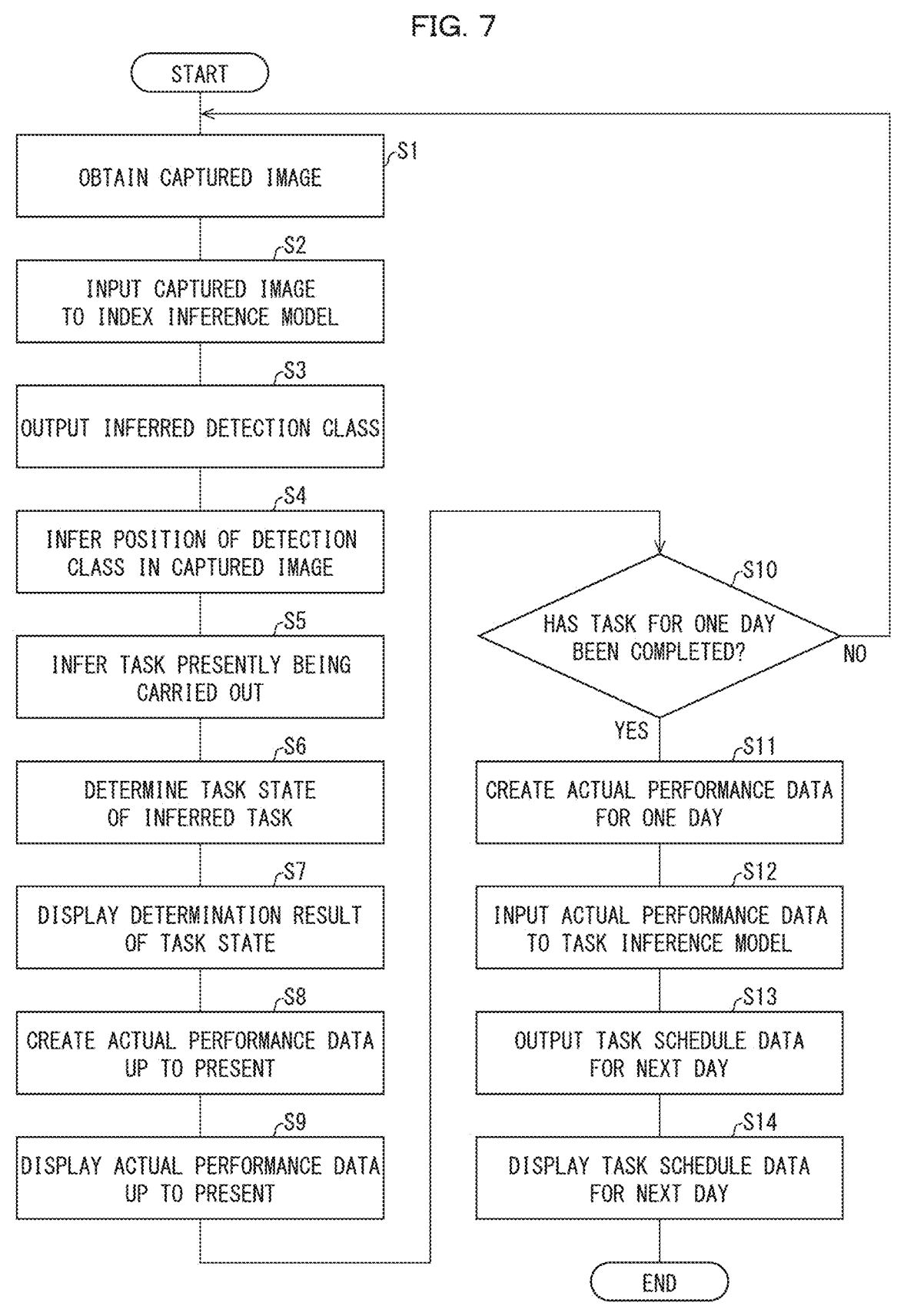

START

S1
OBTAIN CAPTURED IMAGE

S2
INPUT CAPTURED IMAGE
TO INDEX INFERENCE MODEL

S3
OUTPUT INFERRED DETECTION CLASS

S4
INFER POSITION OF DETECTION
CLASS IN CAPTURED IMAGE

S5
INFER TASK PRESENTLY BEING
CARRIED OUT

S6
DETERMINE TASK STATE
OF INFERRED TASK

S7
DISPLAY DETERMINATION RESULT
OF TASK STATE

S8
CREATE ACTUAL PERFORMANCE DATA
UP TO PRESENT

S9
DISPLAY ACTUAL PERFORMANCE DATA
UP TO PRESENT

S10
HAS TASK FOR ONE DAY
BEEN COMPLETED? NO

YES

S11
CREATE ACTUAL PERFORMANCE DATA
FOR ONE DAY

S12
INPUT ACTUAL PERFORMANCE DATA
TO TASK INFERENCE MODEL

S13
OUTPUT TASK SCHEDULE DATA
FOR NEXT DAY

S14
DISPLAY TASK SCHEDULE DATA
FOR NEXT DAY

END

WORK MANAGEMENT DEVICE AND WORK MANAGEMENT METHOD

TECHNICAL FIELD

The present invention relates to a task management device etc.

BACKGROUND ART

A waterworks construction management system disclosed in Patent Literature 1 infers a present task state in waterworks construction, from a feature image that has been detected in a captured image that includes a task target region in the waterworks construction. Then, the waterworks construction management system determines, in accordance with the present task state thus inferred, the content of notification to a person involved in the waterworks construction.

CITATION LIST

Patent Literature

[Patent Literature 1]
Japanese Patent Application Publication Tokukai No. 2020-107341

SUMMARY OF INVENTION

Technical Problem

However, Patent Literature 1 does not specifically disclose any trained model that is constructed by machine learning. An object of an aspect of the present invention is to provide a task management device etc. capable of precisely managing a task by precisely inferring the task with use of a trained model that is constructed by machine learning, the task being a task in operation or a scheduled task.

Solution to Problem

In order to solve the above problem, a task management device in accordance with an aspect of the present invention includes: an image obtaining section configured to obtain a captured image that includes a task target region in waterworks construction; a first outputting section configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; and a task inferring section configured to infer, on the basis of an output result from the first outputting section, a task being carried out at the time point at which the captured image is obtained.

In order to solve the above problem, a task management method in accordance with an aspect of the present invention includes: an image obtaining step of obtaining a captured image that includes a task target region in waterworks construction; an outputting step of outputting at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; and a task inferring step of inferring, on the basis of an output result in the outputting step, a task being carried out at the time point at which the captured image is obtained.

In order to solve the above problem, a task management device in accordance with an aspect of the present invention includes: an image obtaining section configured to obtain a captured image that includes a task target region in waterworks construction; a first outputting section configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; a data creating section configured to create actual performance data that indicates a relation between at least one task carried out in a predetermined task time period and a term in which the task was carried out, by analyzing combinations of indices that the first outputting section outputted over time, the combinations appearing at respective time points at each of which the captured image was obtained within the predetermined task time period; and a second outputting section configured to output task schedule data that indicates a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period.

In order to solve the above problem, a task management method in accordance with an aspect of the present invention includes: an image obtaining step of obtaining a captured image that includes a task target region in waterworks construction; a first outputting step of outputting at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; a data creating step of creating actual performance data that indicates a relation between at least one task carried out in a predetermined task time period and a term in which the task was carried out, by analyzing combinations of indices that were outputted over time in the first outputting step, the combinations appearing at respective time points at each of which the captured image was obtained within the predetermined task time period; and a second outputting step of outputting task schedule data that indicates a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period.

In order to solve the above problem, an index inference model in accordance with an aspect of the present invention includes: an input layer into which a captured image that includes a task target region in waterworks construction is inputted; an output layer which outputs at least one index among a plurality of indices for evaluating a task state in the waterworks construction; and an intermediate layer in which parameters have been learned on the basis of the index, an image that includes the task target region, and an image that indicates an object in use in the waterworks construction, the index inference model causing a computer to function to output, from the output layer via an operation performed by the intermediate layer, the at least one index that is inferred to appear in a task at a time point at which the captured image is obtained, in a case where the captured image is inputted into the input layer.

In order to solve the above problem, a task inference model in accordance with an aspect of the present invention includes: an input layer into which actual performance data is inputted, the actual performance data indicating a relation between at least one task carried out in a predetermined task time period and a term in which the task was carried out; an output layer which outputs task schedule data that indicates a relation between at least one task in a next predetermined task time period and a term in which the task is to be carried out; and an intermediate layer in which parameters have been learned on the basis of (i) past task schedule data which indicates a relation between at least one task that was indicated as a task scheduled to be carried out in an execution plan of past waterworks construction and a term in which the task was carried out, (ii) past actual performance data which indicates a relation between at least one task that was carried out in the past waterworks construction and a term in which the task was carried out, and (iii) factor data that influenced the task in the past waterworks construction, the index inference model causing a computer to function to output, from the output layer, the task schedule data via an operation performed by the intermediate layer, in a case where the actual performance data is inputted into the input layer.

Advantageous Effects of Invention

An aspect of the present invention makes it possible to precisely manage a task by precisely inferring the task with use of a trained model that is constructed by machine learning, the task being a task in operation or a scheduled task.

BRIEF DESCRIPTION OF DRAWINGS

FIG. 5 is a diagram showing a display example of task schedule data that has been outputted by a second outputting section.

FIG. 6 is a diagram showing some examples of a relation between the result of determination by the task state determining section and the content of notification by a display control section.

FIG. 7 is a flowchart showing an example of a process in the task management device.

DESCRIPTION OF EMBODIMENTS

[Configuration of Waterworks Construction Management System]

Figure 1:
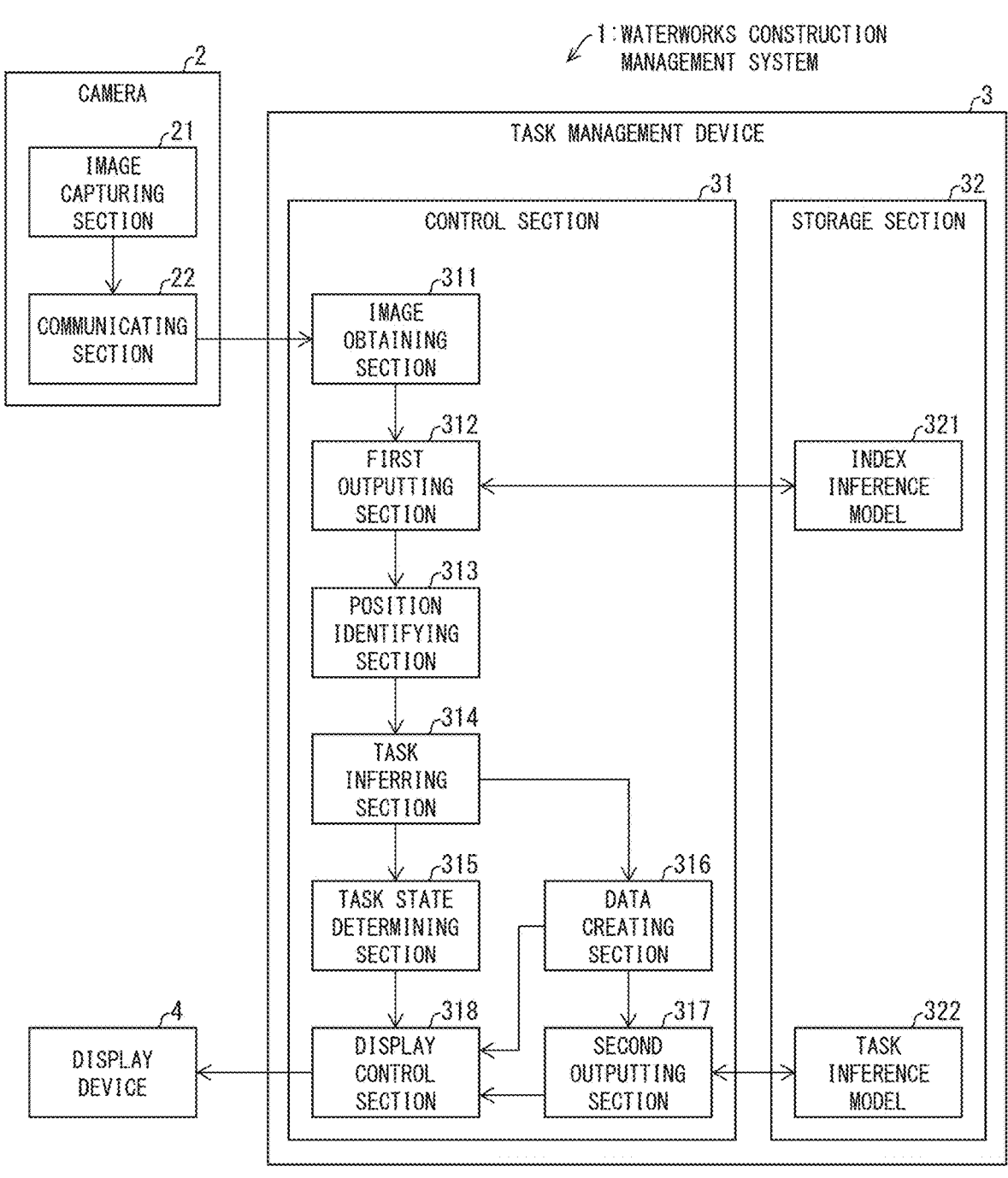
FIG. 1 is a block diagram illustrating an example of a schematic configuration of a waterworks construction management system.

FIG. 1 is a block diagram illustrating an example of a schematic configuration of a waterworks construction management system 1 in accordance with an aspect of the present invention. The water-supply task management system 1 manages various tasks in waterworks construction (e.g., progress of waterworks construction) in which a pipe is to be installed. The waterworks construction management system 1 includes a camera 2, a task management device 3, and a display device 4.

The camera 2 captures an image of each of various tasks that are carried out at one or more waterworks construction sites. The camera 2 should be capable of capturing an image of a task target region where the various tasks are to be carried out. Examples of the camera 2 include a camera which is attached to a helmet or work clothing (e.g.: an arm part of the work clothing) of a worker (person involved in the waterworks construction) for capturing an image of an operation at hand, and a camera which is mounted on any of various working tools (e.g., backhoe). Further, examples of the camera 2 include a camera which is installed in the vicinity of the task target region. The camera 2 includes an image capturing section 21 and a communicating section 22.

The image capturing section 21 captures an image of at least the task target region in the waterworks construction. The image capturing section 21 may capture a static image or a moving image. In one case of waterworks construction, image capturing may be performed a plurality of times. The task target region (consequently, the camera 2) may be fixed or can be moved every image capture which is regarded as a unit. In other words, every time an image is taken, the image capturing section 21 creates a captured image that includes the task target region.

The communicating section 22 is connected with the task management device 3 so as to be capable of communicating with the task management device 3, and forwards, to the task management device 3, data of the captured image that has been obtained by the image capturing section 21. The communicating section 22 and the task management device 3 perform wireless communication, but may perform wired communication.

The task management device 3 manages various tasks that are being carried out as the waterworks construction or manages various tasks that are scheduled to be carried out. The task management device 3 manages a task for each of a plurality of waterworks construction sites in a case where tasks are to be managed at the plurality of waterworks construction sites. The task management device 3 will be discussed later in details.

The display device 4 displays, to a manager who manages the waterworks construction (person involved in the waterworks construction), various pieces of information relevant to the waterworks construction. The display device 4 may display, for example, a task state determination result that is outputted from the task management device 3, actual performance data that indicates actual performance of various tasks in a predetermined task time period, or task schedule data that indicates a schedule of various tasks to be carried out in a next predetermined task time period.

The display device 4 is a monitor or a personal computer with which the manager manages the various tasks. Note that the display device 4 may be an electronic device (e.g., tablet or smartphone) that the worker owns. In this case, the display device 4 can display, to the worker, various pieces of information relevant to the waterworks construction. Further, the waterworks construction management system 1 may include a sound outputting device (e.g., speaker) that outputs each of the above various pieces of information as a sound.

Note that in the present embodiment, the predetermined task time period is assumed to refer to an entire task time period (e.g., 8:00 to 16:30) that is specified for one specific day, and the next predetermined task time period is assumed to refer to an entire task time period (e.g., 8:00 to 16:30) that is specified for the next day following the one specific day. Note however that the predetermined task time period may refer to, for example, a task time period from the start of a task to a time point at which a captured image is obtained. In this case, the next predetermined task time period refers to a task time period subsequent to the time point at which the captured image is obtained.

(Configuration of Task Management Device)

The task management device 3 includes a control section 31 and a storage section 32. The control section 31 comprehensively controls each section of the task management device 3. The storage section 32 stores various programs and various data that are used by the control section 31. The storage section 32 stores, for example, an index inference model 321 and a task inference model 322 which will be described later. The storage section 32 may be realized by a storage device that is different from the task management device 3 and that is connected with the task management device 3 so as to be capable of communicating with the task management device 3.

The control section 31 includes an image obtaining section 311, a first outputting section 312, a position identifying section 313, a task inferring section 314, a task state determining section 315, a data creating section 316, a second outputting section 317, and a display control section 318.

The image obtaining section 311 obtains a captured image that is transferred from the camera 2. The captured image includes a task target region in waterworks construction.

The first outputting section 312 inputs, to the index inference model 321 that is stored in the storage section 32, the captured image that has been obtained by the image obtaining section 311. The index inference model 321 is a trained model that is constructed, by machine learning, to infer at least one index that appears in a task at a specified time point among a plurality of indices for evaluating a task state in the waterworks construction. In the present embodiment, the index is referred to as a detection class that needs to be detected from the captured image in order to evaluate the task state.

Examples of the detection class include a single object such as any of various pipes used in waterworks construction, a worker, a general person other than the worker, any of various working tools used in the waterworks construction, and a groove in which the pipe is installed. The detection class may correspond to a combination of a plurality of the single objects. It is possible to set, as one detection class, for example, a combination of a groove and a worker who is in the groove.

Examples of the various pipes include straight pipes and deformed pipes. Examples of various working tools (e.g., work machines (work vehicles) and tools) include, for example, an asphalt cutter, a backhoe, a dump truck, a rammer, a cone (or a pole), a sheet pile, a stopper, a sleeper, and a ladder. Further, it is possible that a working tool that is set as a detection class may be a part of the working tool. For example, it is possible to set, as a detection class, a sling belt and a bucket that is a part of the backhoe.

It is possible to set, as a detection class, an object that allows the task state to be determined. For example, it is possible to set, as a detection class, for example, an object that characterizes that an appropriate task (standard task) is being carried out and an object that characterizes a dangerous task. Examples of such an object which characterizes that a standard task is being carried out include a work posture of a worker who is carrying out the standard task. Examples of the object which characterizes a dangerous task include a groove for which no safety cone is placed The index inference model 321 is a trained model that is constructed so as to extract and output, as a result of inputting the captured image, a detection class as described above which is included in the captured image. The index inference model 321 may be, for example, a neural network (e.g., convolutional neural network (CNN)) that includes at least an input layer, an intermediate layer, and an output layer.

In the index inference model 321, the input layer is a layer into which the captured image is inputted. The intermediate layer is a layer in which parameters have been learned on the basis of a region image that includes the task target region, an article image that indicates an object to be used in the waterworks construction, and the detection class. The output layer is a layer that outputs at least one detection class.

Prepared as training data is, for example, data in which the detection class as correct answer data is associated with each of a plurality of region images and each of a plurality of article images. The index inference model 321 is constructed by sequentially inputting training data and learning parameters (weights and biases) so as to minimize a loss function. The index inference model 321 is constructed, for example, by a model generating device (not shown). However, the index inference model 321 is not limited to a model thus constructed, and may be constructed, for example, by the control section 31. In this case, the control section 31 also has a function as a learning device that constructs the index inference model 321 by machine learning with use of the training data.

Note that other trained models, which will be described later, may be constructed by sequentially inputting training data and learning parameters so as to minimize the loss function, and may be constructed by the model generating device or the control section 31.

The region image may be a difference image or a composite image other than the captured image that has been captured by the camera 2. The difference image is, for example, an image obtained by extracting a difference between two captured images that were taken over time. The composite image is, for example, an image in which any of various background images (virtual background images) that were prepared in advance is embedded in a background region of the task target region whose image was captured. The article image may be an image that was obtained by capturing an image of one or more of the above-described various pipes and various working tools. It is possible to prepare, as the article image for one pipe and one working tool, a plurality of images which are obtained by changing the size of the pipe and the size of the working tool. In this way, by preparing such a processed image in addition to the captured image, it becomes possible to prepare a variety of training data from a smaller number of captured images. Further, the region image and the article image may include an image that is suitable for inference of the detection class.

The index inference model 321 that is constructed in the above-described manner causes a computer to function to output, from the output layer via an operation performed by the intermediate layer, the detection class that is inferred to appear in a task at a time point at which a captured image is obtained, in a case where the captured image is inputted into the input layer. That is, the first outputting section 312 inputs the captured image to the index inference model 321, and then outputs at least one detection class that is inferred to appear in the task at the time point at which the captured image is obtained. Note that a time point at which a captured image is obtained refers to a time point at which a captured image is obtained by the image obtaining section 311, but it may be alternatively read as a time point at which an image of a task target region is captured by the camera 2.

Figure 2:
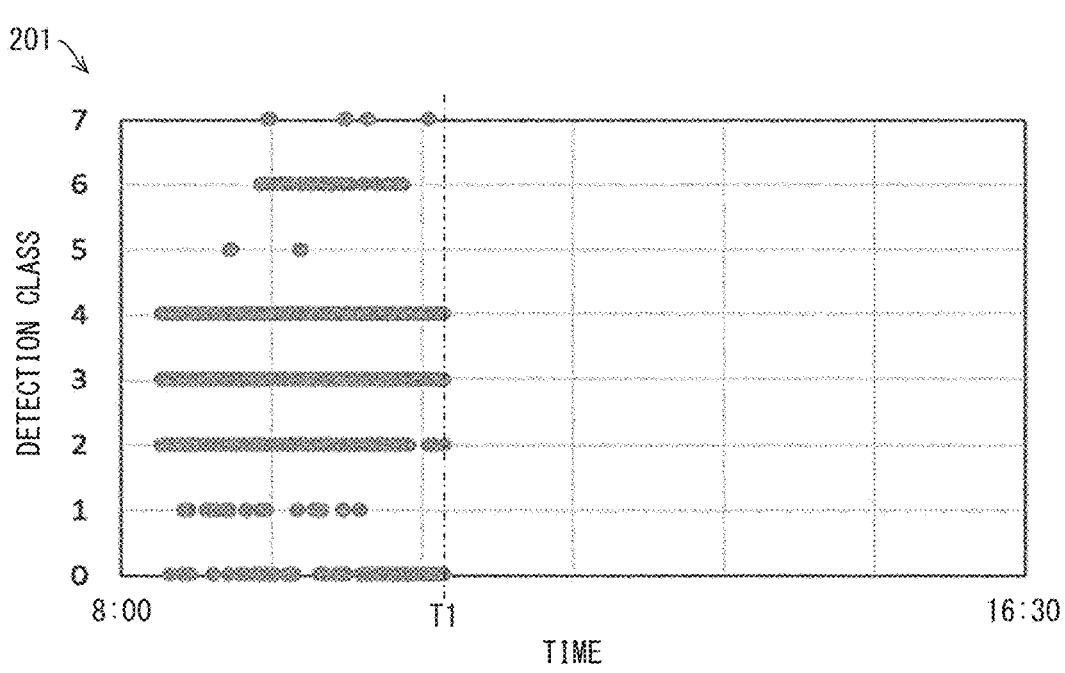
FIG. 2 is a diagram showing an example of an output result from a first outputting section.
Figure 2:
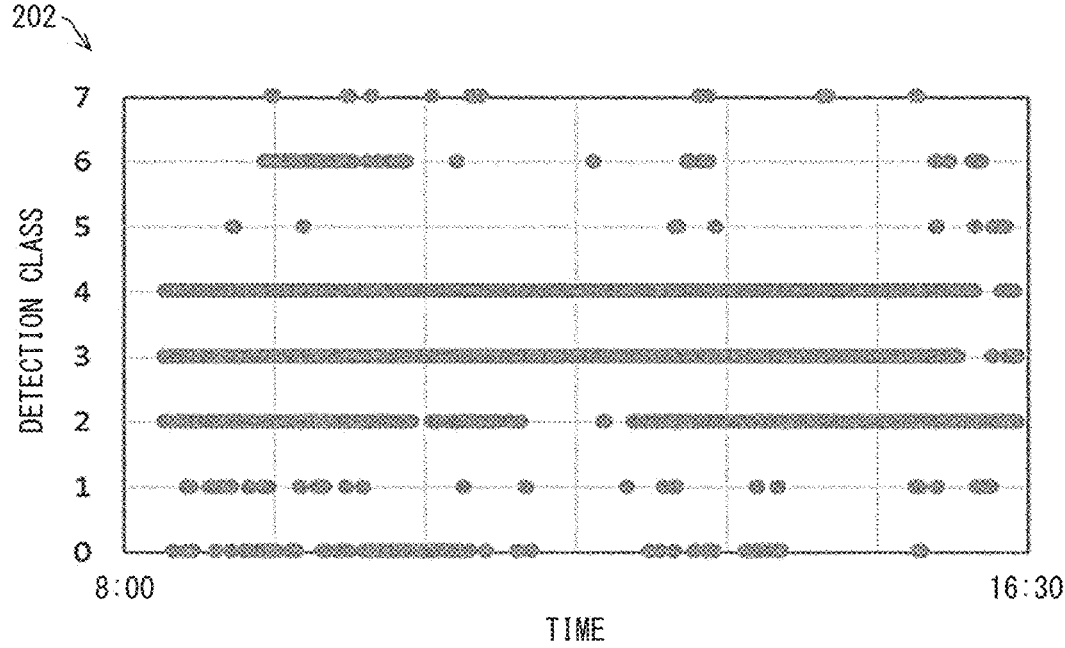

FIG. 2 is a diagram showing an example of an output result from the first outputting section 312. Reference sign 201 in FIG. 2 indicates an output result from the start of a task to the time T1 on one specific day, and reference sign 202 indicates an output result from the start of a task to the end of the task on the one specific day. In the diagram indicated by each of reference signs 201 and 202, the vertical axis represents the number assigned to each detection class, and the horizontal axis represents the task time. For example, the number is assigned to each of the above-described detection classes. For example, "0" is assigned to the worker, "1" to the straight pipe, "2" to the deformed pipe, "3" to the backhoe, and "4" to the sling belt. In the example of FIG. 2, "0" to "7" are shown as the numbers corresponding to the detection classes. The number of the aforesaid numbers assigned to the detection classes corresponds to the number of detection classes that are preset.

For example, consider a case where the captured image obtained at the time point of time T1 includes a worker, a deformed pipe, a backhoe, and a sling belt. In this case, the first outputting section 312 outputs, at time T1, a combination of "0" and "2" to "4" that correspond to those detection classes, as shown in the diagram indicated by reference sign 201 in FIG. 2. The first outputting section 312 inputs, to the index inference model 321, the captured image over time from the start of the task. Therefore, as indicated by reference sign 201, at the time point of time T1, the first outputting section 312 can output a combination of the detection classes at each time point from the start of the task (8:00) to the time point of time T1. As a result, as in the diagram indicated by reference sign 202, at the time point at which the task ends on the one day, the first outputting section 312 can output a combination of detection classes at each time point from the start of the task to the end of the task on the one day.

Note that the index inference model 321 outputs a numerical value (e.g., a numerical value of 0 or more and 1 or less) of each detection class as a result of the above operation. The larger the numerical value is, the higher the degree of certainty that the captured image contains the object indicated by the detection class becomes. Therefore, the index inference model 321 infers, as the detection class that is included in the captured image, a detection class whose numerical value is equal to or greater than a predetermined threshold value. The index inference model 321 may output, as an output result together with the detection class, for example, the numerical value described above as the degree of accuracy (reliability) of the inference of the detection class.

The position identifying section 313 identifies, in the captured image, a position of the detection class that has been outputted by the first outputting section 312. The position identifying section 313 can identify the position of the detection class in the captured image, for example, by inputting the captured image to a position inference model that is constructed so as to infer the position of the detection class in the captured image with use of training data in which the article image and the detection class are associated with each other. The position inference model may be stored in the storage section 32 and may be, for example, a trained model that is realized by regions with CNN (R-CNN).

The task inferring section 314 infers, on the basis of the output result from the first outputting section 312, a task that is being carried out at the time point at which the captured image is obtained. Specifically, the task inferring section 314 infers the task that was being carried out at the time point at which the image obtaining section 311 most recently obtained the captured image, by analyzing combinations of detection classes that the first outputting section 312 outputted over time, the combinations appearing at respective time points at each of which the captured image was obtained. That is, the task inferring section 314 infers the task that is presently being carried out, from a combination of detection classes that is inferred on the basis of the captured image that the image obtaining section 311 most recently obtained and a combination of detection classes that is inferred on the basis of the captured image (past captured image) at at least one time point immediately before the time point at which the image obtaining section 311 most recently obtained the captured image.

The storage section 32 stores combinations of detection classes in association with respective corresponding tasks that can be carried out in the waterworks construction. The task inferring section 314 identifies, on the basis of the output result (combination of detection classes) from the first outputting section 312 at each time point, a task that corresponds to the combination as a task that is being carried out at the time point at which the captured image is obtained.

For example, in a task step of lifting and installing a straight pipe, there is a task of removing a foreign material in a socket groove. This task is associated with, for example, a combination of a worker, a straight pipe, a socket groove, and an object (foreign material) that is present in the socket groove, as a detection class. The task inferring section 314 determines whether the above task is being carried out, by determining, in the captured image and on the basis of the output result from the first outputting section 312, the presence or absence of the worker, the straight pipe, the socket groove, and the object that is present in the socket groove at each of successive time points in the captured image.

The task inferring section 314 may infer, with use of an implemented-task inference model, a task that is being carried out at the time point at which the captured image is obtained. The implemented-task inference model is a model that is constructed, with use of training data in which the combinations of detection classes are associated with the respective corresponding tasks, so as to infer the tasks. In this case, the task inferring section 314 can infer the task by inputting, to the implemented-task inference model, the output result from the first outputting section 312. The task inference model may be stored in the storage section 32, and may be, for example, a trained model that is realized by the CNN.

In addition, in a case where the position identifying section 313 identifies the position of the detection class in the captured image, the task inferring section 314 may infer, on the basis of the position of the detection class, a task being carried out in each of different regions in the captured image. The task inferring section 314 may determine, for example, according to types of the detection classes inferred and positions of the detection classes identified, whether or not the captured image includes scenes in each of which waterworks construction is carried out. The task inferring section 314 infers, in a case where it is determined that the waterworks construction is carried out in each of the different regions in the captured image, the task being carried out in each of the regions.

The task state determining section 315 determines whether or not the task state of the task inferred by the task inferring section 314 is appropriate, by analyzing the combinations of detection classes that the first outputting section 312 outputted over time, the combinations appearing at respective time points at each of which the captured image was obtained. That is, the task state determining section 315 determines whether or not the task that is inferred to be presently being carried out is appropriate, on the basis of a combination of detection classes that is inferred on the basis of the captured image which the image obtaining section 311 most recently obtained and a combination of detection classes that had been inferred on the basis of the captured image at at least one time point immediately before the time point at which the image obtaining section 311 most recently obtained the captured image. A result of this determination indicates actual performance of each of tasks.

Specifically, the task state determining section 315 determines, as to whether or not the task state is appropriate, at least one of (i) whether or not a task procedure is appropriate, (ii) whether or not safety is ensured, and (iii) whether or not the task is delayed.

Whether or not the task procedure is appropriate may be determined on the basis of, for example, combinations of detection classes in captured images at respective successive time points and positions or a position change over time of a certain detection class in the captured images at the respective time points.

The following will show example tasks for each of which the task state determining section 315 determines a task state. The following describes the example tasks that are carried out in task steps from the task step of lifting and installing a pipe to the task step of checking a fitting connection. The following describes the case of a straight pipe and the case of a deformed pipe, separately.

For example, assume a case where a task of removing a foreign material in the socket groove is being carried out. In this case, for example, the task state determining section 315 determines whether or not an object exists in the socket groove at each of successive time points (position change of the object) in the captured images. The task state determining section 315 thus determines whether or not the task procedure is appropriate. The task state determining section 315 can also carry out the same process in a case where the task of removing a foreign material (including oil, sand, or lubricant) that is adhered to an outer surface of an insertion port in a portion of approximately 30 cm from an end surface of the insertion port and to an inner surface of a socket is being carried out. That is, the task state determining section 315 can determine whether or not the task procedure is appropriate, by determining, for example, the presence or absence of an object that exists at such positions at each of successive time points (position change of the object). In other words, in a case where (a) an area that the object occupies on the socket groove or the like decreases in the captured image every time a time period passes and (b) it is determined that the area is determined to be equal to or less than the predetermined area, the task state determining section 315 can determine that the foreign material has been removed. In this case, the task state determining section 315 can determine that the task procedure of the task of removing a foreign material on, for example, the socket groove is appropriate.

The task state determining section 315 can also determine whether or not task quality is ensured while determining whether or not the task procedure is appropriate on the basis of the captured image as described above. The task state determining section 315 can determine that the task quality of the task of removing the foreign material from the socket groove or the like is good, for example, in the case of a state in which substantially no object exists in the socket groove in the captured image.

Note that the above described task (i.e., the task of removing the foreign material in the socket groove and the foreign material that is adhered to the outer surface of the insertion port in the portion of approximately 30 cm from the end surface of the insertion port and to the inner surface of the socket) may be a task for which the task state determining section 315 determines a task state in both of the cases of the straight pipe and the deformed pipe. Similarly for another task, the task state determining section 315 can determine whether or not the task procedure and the task quality are appropriate/good by analyzing, for the another task, the combination of detection classes in the captured image, the position of the detection classes, and the like.

As examples of determination items of the task state determining section 315 for the another task, the following determination items can be included in the case of a straight pipe.

Is a predetermined lubricant (e.g., lubricant for ductile iron pipe fittings) used?

At the time of insertion of the insertion port, is the insertion port correctly inserted into the socket with use of a lever hoist or a dedicated simple joining device (e.g., SITE CONNECT)?

Has a worker checked the position of a rubber band with use of a dedicated check gauge or with use of a dedicated rubber band position measuring instrument (SITE CHECKER)?

On the other hand, as examples of determination items of the task state determining section 315 for the another task, the following determination items can be included in the case of a deformed pipe.

Is the measured value of the amount of insertion from the end surface of the socket to a deep side of the socket clearly indicated by a white line on an entire circumference or at four points on the circumference of the outer surface of the insertion port?

Is a predetermined lubricant (e.g., lubricant for ductile iron pipe fittings) used and is the lubricant applied to a correct area?

Has a worker checked that the outer surface of the insertion port is inserted into the socket all along the entire circumference of the outer surface until the white line clearly indicated on the insertion port reaches the position of the end surface of the socket?

Have a T-head bolt and a nut been set on a socket flange and in a bolt hole of a push ring while a rubber band is placed on a socket side, and is there no gap in the bolt hole of the push ring?

Has a worker tightened nuts little by little that are located at positions substantially symmetrical to each other, with use of a power tool (e.g., impact wrench), while taking care that the distance between the socket and the push ring is even along the entire circumference of the outer surface of the insertion port?

Has a worker checked with use of a clearance gauge (e.g., 0.5 mm thick) that, after the nuts have been tightened, a construction management projection of the push ring and the socket are in contact with each other and there is no gap between the push ring and the socket?

Whether or not the safety is ensured can also be determined on the basis of, for example, combinations of detection classes in captured images at respective successive time points and a position or a position change over time of a certain detection class in the captured images at respective time points.

Here, examples of accidents, prevention of which is desired, in each of the tasks include the following accidents.

(Accident 1) A general person falls into a groove.

(Accident 2) A work vehicle (e.g., dump truck or backhoe) contacts a worker or general person. (The worker or general person is collectively referred to as "person".)

(Accident 3) A pipe falls, when lifted, and contacts a person.

(Accident 4) The contents of a bucket fall, and contact a person.

(Accident 5) A groove collapses.

(Accident 6) A pipe placed at a construction site contacts a person.

(Accident 7) A tool or the like falls into a groove and contacts a person.

(Accident 8) A worker falls down from a ladder.

The task state determining section 315 can determine whether or not the task state is a state in which any of the above accidents (Accident 1) to (Accident 8) may occur, on the basis of the combinations of the detection classes as described above and the position change of the certain detection class over time. The following shows an example of a process in a case where it is determined that an accident of the above (Accident 1) to (Accident 8) may occur.

The task state determining section 315 can determine whether or not the accident described in the above (Accident 1) may occur, in a case where a groove, safety cones, and a general person are extracted as an output result (detection classes) of the index inference model 321. For example, assume a case where the task state determining section 315 has been detecting a general person for a predetermined period in a closed region that is formed by a curve that connects the safety cones (or a curve surrounding the outer periphery of the groove) in the captured image. In this case, the task state determining section 315 determines that the task state is a state in which the accident described in the above (Accident 1) may occur and the safety is not ensured (i.e., a dangerous state). The task state determining section 315 can detect the curve and the general person from the captured image after performing bird's eye view transform on the captured image.

Whether or not the accident described in the above (Accident 1) may occur can be determined, in a case where a worker or a helmet is extracted, as the detection classes, in place of the general person. In this case, the task state determining section 315 can infer that a worker is present in the enclosed space when the helmet has been detected for a predetermined time period of time, and further can determine that the task state is a dangerous state. The task state determining section 315 can determine that the task state is a dangerous state in which the accident described in the above (Accident 1) may occur, in a case where a groove is extracted as the detection class but no safety cone is extracted.

The task state determining section 315 can determine whether or not an accident described in the above (Accident 2) may occur, in a case where a work vehicle and a person are extracted as the detection classes. For example, the task state determining section 315 can determine that the task state is a dangerous state in which the accident described in the above (Accident 2) may occur, in a case where the distance between the work vehicle or a part (e.g., bucket) of the work vehicle and the person is equal to or less than a predetermined value in the captured image. The captured image may be obtained from the camera 2 that is installed in the work vehicle or the camera 2 that is installed in a place where the waterworks construction is being carried out. Further, the task state determining section 315 can detect the work vehicle, the person, and the distance from the captured image after performing bird's eye view transform on the captured image. Furthermore, the task state determining section 315 can determine that the task state is a dangerous state in which the accident described in the above (Accident 2) may occur, in a case where in the captured image, a direction of the face of the person is detected and no work vehicle is located in the direction.

The task state determining section 315 can determine whether or not an accident described in the above (Accident 3) may occur, in a case where a pipe and a sling belt are extracted as the detection classes. For example, the task state determining section 315 can determine that the task state is a dangerous state in which the accident described in the above (Accident 3) may occur, in a case where in the captured image, an inclination of the pipe with respect to the ground is detected and the inclination is equal to or greater than a predetermined angle (e.g., 30°). Further, the task state determining section 315 can determine that the task state is a dangerous state in which the accident described in the above (Accident 3) may occur, in a case where in the captured image, a hook angle that is made between two sling belts is calculated and the hook angle is equal to or greater than a predetermined angle (e.g., 60°. In a case where the hook angle is equal to or greater than the predetermined angle, there is a risk that the pipe, which is a lifted load, may slip sideways. Further, the task state determining section 315 can determine that the task state is a dangerous state in which the accident described in the above (Accident 3) may occur, in a case where only one sling belt is detected in the captured image.

The task state determining section 315 can determine whether or not an accident described in the above (Accident 4) may occur, in a case where a bucket and a person are extracted as the detection classes. For example, the task state determining section 315 can determine that the task state is a dangerous state in which the accident described in the above (Accident 4) may occur, in a case where in the captured image, a person is located below the bucket or a person is located within a predetermined area around the bucket. Further, the task state determining section 315 can detect relative positions of the bucket and the person from the captured image after performing bird's eye view transform on the captured image. Furthermore, the task state determining section 315 can determine that the task state is a dangerous state in which the accident described in the above (Accident 4) may occur, in a case where in the captured image, an inclination of an opening surface of the bucket with respect to the ground is equal to or greater than a predetermined angle The task state determining section 315 can determine whether or not an accident described in the above (Accident 5) may occur, in a case where a groove and a sheet pile are extracted as the detection classes. For example, the task state determining section 315 can determine that the task state is a dangerous state in which the accident described in the above (Accident 5) may occur, in a case where in the captured image, the groove has a predetermined shape (a shape that may result in collapse of the groove). Further, the task state determining section 315 can determine that the task state is a dangerous state in which the accident described in the above (Accident 5) may occur, in a case where in the captured image, an angle, with respect to the ground, of the sheet pile driven into the groove is equal to or less than the predetermined angle (in a case where the degree of inclination of the sheet pile is large). Furthermore, the task state determining section 315 can determine that the task state is a dangerous state in which the accident described in the above (Accident 5) may occur, in a case where in the captured image, a rod for preventing inclination of the sheet pile cannot be detected. Furthermore, the task state determining section 315 can determine that the task state is a dangerous state in which the accident described in the above (Accident 5) may occur, in a case where a groove is extracted as the detection class but no sheet pile is extracted.

The task state determining section 315 can determine whether or not an accident described in the above (Accident 6) may occur, in a case where a pipe, a sleeper, and a stopper are extracted as the detection classes. The sleeper and the stopper are intended to prevent rolling of the pipe. For example, the task state determining section 315 determines that the pipe is a pipe that is waiting to be joined, in a case where no change occurs in position of the pipe for a predetermined time period in the captured image. The task state determining section 315 can determine that the task state is a dangerous state in which the accident described in the above (Accident 6) may occur, in a case where in the captured image, the positional relation between (i) the pipe waiting to be joined and (ii) the sleeper and the stopper is not a predetermined positional relation.

Further, assume a case where the pipe is extracted as the detection class but in the captured image, no sleeper or stopper is extracted as the detection class while the pipe is located outside the groove (on the ground) for a predetermined time period. In this case, the task state determining section 315 can determine that the task state is a dangerous state in which the accident described in the above (Accident 6) may occur, since in the captured image, neither a sleeper nor a stopper necessary for the pipe to be placed on the ground can be detected.

The task state determining section 315 can determine whether or not an accident described in the above (Accident 7) may occur, in a case where an outer peripheral portion (line) of a groove and a tool are extracted as the detection classes. For example, the task state determining section 315 can determine that the task state is a dangerous state in which the accident described in the above (Accident 7) may occur, in a case where in the captured image, the tool is located at the outer peripheral portion of the groove. Further, the task state determining section 315 can detect the outer peripheral portion of the groove and the tool from the captured image after performing bird's eye view transform on the captured image.

The task state determining section 315 can determine whether or not an accident described in the above (Accident 8) may occur, in a case where a ladder, a groove sidewall, and a worker are extracted as the detection classes. For example, the task state determining section 315 can determine that the task state is a dangerous state in which the accident described in the above (Accident 8) may occur, in a case where in the captured image, an angle formed between the ladder and the groove sidewall where the ladder is installed is calculated and the angle thus formed is equal to or less than a predetermined angle. Further, the task state determining section 315 can determine that the task state is a dangerous state in which the accident described in the above (Accident 8) may occur, in a case where in the captured image, the worker is carrying out a task other than ascending/descending the ladder.

Note that, in a case where an object is detected from the captured image, the task state determining section 315 can create three-dimensional point cloud data of the captured image, and detect the object from the three-dimensional point cloud data or detect the object by an edge detection process. Further, it is possible to take a measured value of a distance between objects with use of a ranging sensor (e.g., time of flight (TOF) sensor).

Further, the task state determining section 315 may determine appropriateness of a task procedure with use of a procedure inference model that is constructed so as to infer whether or not the task procedure is appropriate. The procedure inference model here is constructed with use of training data in which the appropriateness of the task procedure is associated with a combination of detection classes and a position or position change over time of a detection class. Further, the task state determining section 315 can determine the safety with use of a safety inference model that is constructed so as to infer the safety. The safety inference model here is constructed with use of training data in which the safety of the task is associated with a combination of detection classes and a position or position change over time of a detection class. Further, the task state determining section 315 may determine whether task quality is good or poor with use of a quality inference model that is constructed so as to infer whether or not the task quality is good or poor. The quality inference model here is constructed with use of training data in which whether the task quality is good or poor is associated with a combination of detection classes and a position or position change over time of a detection class. Each of the procedure inference model, the safety inference model, and the quality inference model may be stored in the storage section 32, and may be, for example, a trained model that is realized by the CNN.

Further, whether or not the task is delayed may be determined by comparing a task time period of the task inferred by the task inferring section 314 with task step data that indicates a relation between tasks to be carried out on that day and respective terms in which the tasks are to be carried out. The task state determining section 315 can determine that a task is delayed in a case where it is determined that a predetermined time period or more has elapsed as compared to the task time period that is scheduled for the task. The predetermined time period may be set for each task on the basis of actual performance of the task or the like. Further, by setting the predetermined time period in steps, it is possible to determine a degree of such delay in the steps. The task step data may be stored in the storage section 32.

The display control section 318 causes the display device 4 to display various pieces of information by controlling the display device 4. The display control section 318 may cause, for example, a result of determination of the task state described above to be displayed in real time at a time point at which the result of determination is obtained. By displaying the result of determination of the task state, the display control section 318 can function as a warning section that issues a warning to a manager or a worker in a case where the task state determining section 315 has determined that the task state is not appropriate.

Figure 3:
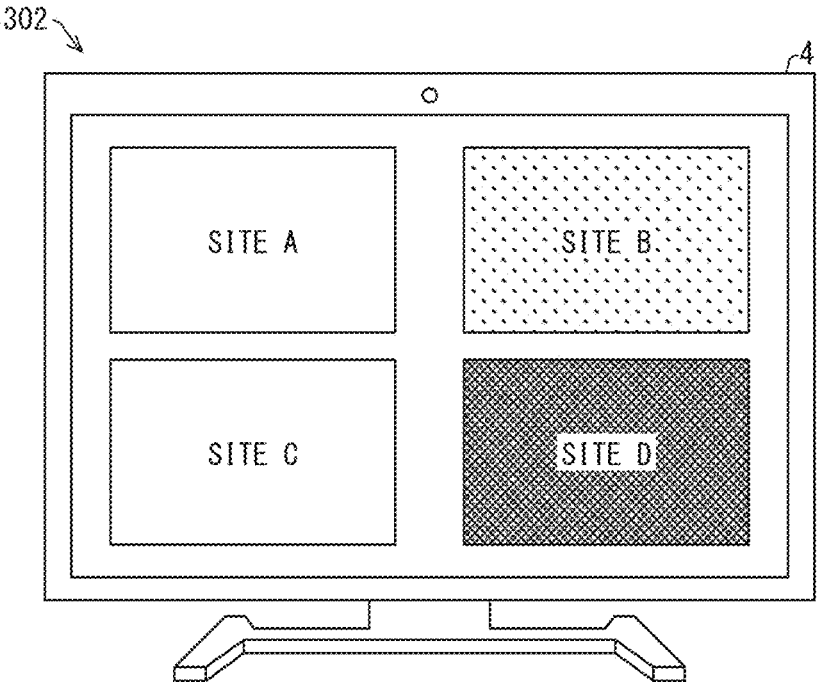
FIG. 3 is a diagram illustrating a display example of a result of determination on a task state by a task state determining section.

FIG. 3 is a diagram illustrating a display example of a result of determination on a task state by the task state determining section 315. Reference sign 301 in FIG. 3 indicates a diagram that shows a display example as to (i) whether the task procedure is appropriate, (ii) whether the safety is ensured, and (iii) whether the task is delayed. In the example indicated by reference sign 301, a case in which the task state is appropriate is expressed as "normal" and a case in which the task state is not appropriate is expressed as "abnormal". Reference sign 302 in FIG. 3 indicates a diagram that shows a display example of a result of determining, for each of construction sites, whether or not a task is delayed.

The example indicated by reference sign 301 shows that in a task step of joining pipes at a certain site, a task procedure of a task that is presently being carried out is appropriate and that the task is not delayed, but that the safety is not ensured. That is, in this example, a warning is issued as to a state in which the safety is not ensured. The example indicated by reference sign 302 shows whether or not the task is delayed in the steps and for each of the construction sites. The example indicated by reference sign 302 shows that the task is not delayed at sites A and C, but the task is slightly delayed at site B, and the task is obviously delayed at site D. That is, in this example, it is warned that the task at least at site D is delayed.

In addition, in order to prevent the above-described (Accident 1) to (Accident 8), in a case where the task state determining section 315 determines that the task state is a state in which the safety is not ensured, the display control section 318 may cause the display device 4 to display an image for calling attention of the manager or the worker. For example, the display control section 318 may call attention in the following manners. Note that such attention call may be realized by outputting a voice or a warning sound from a sound outputting device.

In the case of (Accident 1): Warn that no safety cone is placed.
In the case of (Accident 2): Warn that there is a work vehicle nearby.
In the case of (Accident 3): Warn that the pipe is inclined greatly; or warn that only one sling belt is used.
In the case of (Accident 4): Warn that there is a bucket nearby;
or, warn that the inclination of the bucket is increased.
In the case of (Accident 5): Warn that a sheet pile is not driven into the groove (urging to drive a sheet pile into the groove); or warn that the sheet pile driven into the groove is inclined (not driven in a substantially vertical manner).
In the case of (Accident 6): Warn that no sleeper or stopper is installed.
In the case of (Accident 7): Warn that a tool may fall into the groove.
In the case of (Accident 8): Warn that the ladder is unstable. Warn that the worker is carrying out a task other than descending/ascending the ladder.

Note that the task state determining section 315 does not need to determine all of: whether or not the task procedure is appropriate; whether or not the task quality is ensured; whether or not the safety is ensured; and whether or not the task is delayed. The task state determining section 315 can determine at least one task state among the above task states. The display control section 318 should display the result of determination on the task state that has been determined by the task state determining section 315.

The data creating section 316 analyzes combinations of detection classes that appear at time points at each of which the captured image outputted from the first outputting section 312 over time is obtained within the entire task time period of one specific day. The data creating section 316 creates, by analyzing the combinations of the detection classes, actual performance data that indicates a relation between (a) one or more tasks that were carried out in the entire task time period of the one specific day and (b) terms in which the tasks were carried out. This actual performance data indicates actual task performance for the tasks for the one day (actual task performance in a predetermined task time period), and comprehensively indicates actual performance of each of the tasks which were carried out on that day.

In the present embodiment, the task inferring section 314 infers the task at each of the time points at each of which the captured image is obtained, by analyzing the combination of the detection classes. Therefore, the data creating section 316 should create the actual performance data with use of such an inference result of the tasks for one day, the tasks having been inferred by the task inferring section 314.

Further, the data creating section 316 may create procedure appropriateness data and occurrence-of-danger presence data by analyzing the combinations of the detection classes described above. The procedure appropriateness data is data that indicates whether or not the task procedure of each of the tasks in the entire task time period of one day is appropriate. The occurrence-of-danger presence data is data that indicates the presence or absence of the occurrence of a dangerous task in the entire task time period of one day.

In the present embodiment, the task state determining section 315 determines whether or not the task state of each of the tasks at the time points at each of which the captured image is obtained is appropriate, by analyzing the combinations of the detection classes. Therefore, the data creating section 316 should create the procedure appropriateness data with use of the result of determination, which has been made by the task state determining section 315, on appropriateness of the task procedure of each of the tasks for one day. The data creating section 316 should create occurrence-of-danger presence data with use of the result of determination, which has been made by the task state determining section 315, on the safety of each of the tasks for the one day.

Further, the data creating section 316 may create, by analyzing the combinations of the detection classes, actual performance data, procedure appropriateness data, and occurrence-of-danger presence data up to the time point at which the captured image is obtained. In this case, the data creating section 316 can create those data in real time.

In the present embodiment, the data creating section 316 should create, with use of the result of inference of the task by the task inferring section 314, actual performance data that indicates a relation between a task inferred to have been carried out up to the time point at which the captured image is obtained and a term in which the task was carried out. Further, the data creating section 316 should to create, with use of the result of determination on whether or not the task state of each of the tasks is appropriate by the task state determining section 315, procedure appropriateness data that indicates whether or not the task procedure of each of the tasks is appropriate up to the time point at which the captured image is obtained. Further, the data creating section 316 should to create, for example, with use of the result of determination of whether or not the task state is appropriate, occurrence-of-danger presence data that indicates the presence or absence of the occurrence of a dangerous task up to the time point at which the captured image is obtained.

Further, as described above, the task state determining section 315 can also determine whether or not the task quality is ensured on the basis of the captured image. Therefore, as in the cases of the procedure appropriateness data and the occurrence-of-danger presence data, the data creating section 316 can create, by analyzing the combinations of the detection classes, good/poor quality data that indicates whether or not the task quality of each of the tasks is good or poor for one day or up to the time point at which the captured image is obtained.

Figure 4:
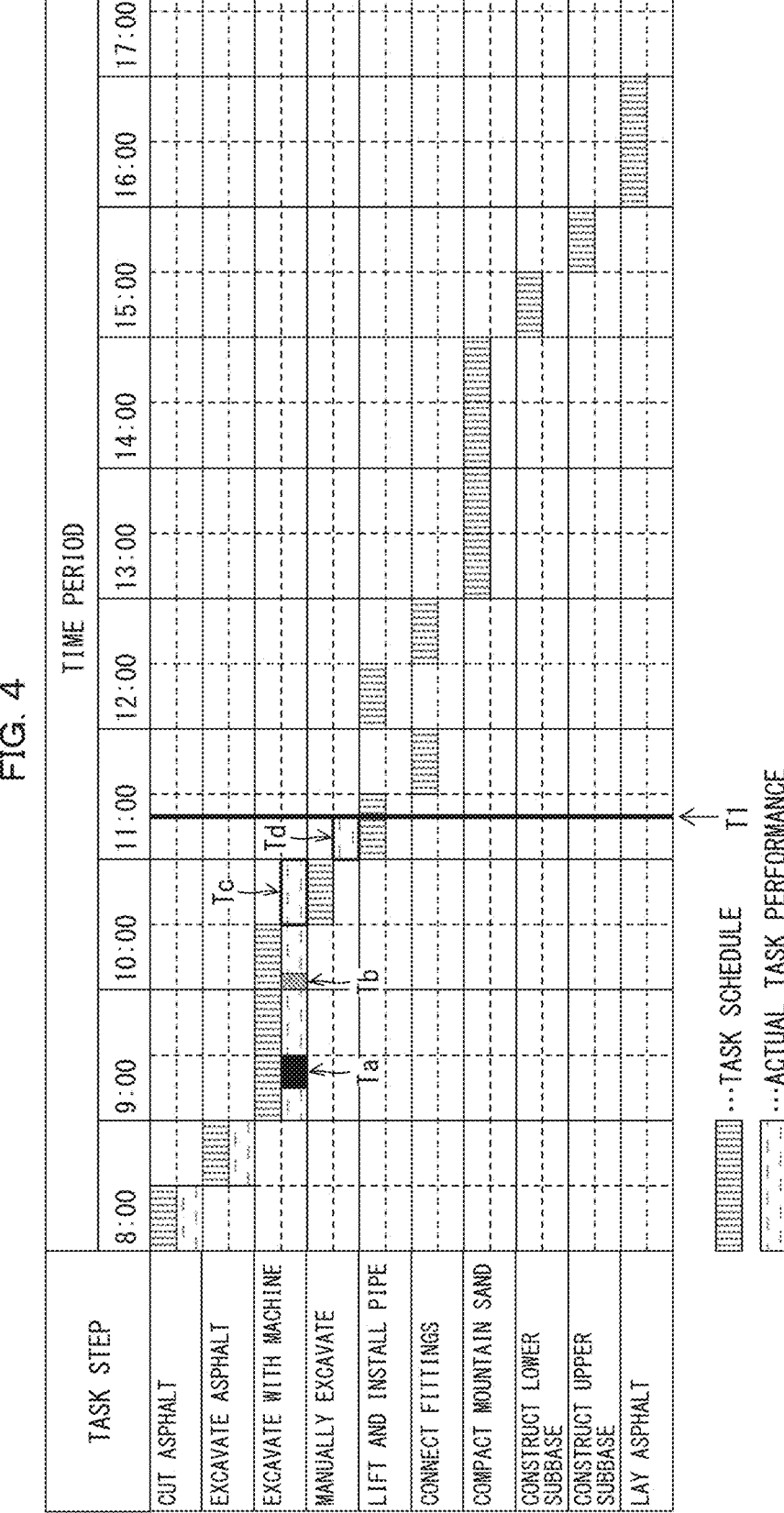
FIG. 4 is a diagram showing a display example of actual performance data that is created by a data creating section.

The display control section 318 can cause the display device 4 to display in real time, for example, the actual performance data that has been created by the data creating section 316. FIG. 4 is a diagram showing a display example of the actual performance data. FIG. 4 shows, as a time period in which the task is carried out, a time period in which a task step (e.g., asphalt cutting) that includes at least one task is carried out. The same applies to FIG. 5.

In the example of FIG. 4, actual performance data ("actual task performance" in FIG. 4) up to the time point at which the captured image is obtained (time T1) is shown, in the form of an execution process chart, together with task step data ("task schedule" in FIG. 4) that indicates a relation between tasks to be carried out on that day and respective terms in which the tasks are to be carried out. The actual performance data is created by the data creating section 316.

Further, the display control section 318 may cause the display device 4 to display information on the basis of the procedure appropriateness data and the occurrence-of-danger presence data in real time, as illustrated in FIG. 4. The example of FIG. 4 indicates that a dangerous task occurred in a term Ta on the basis of the occurrence-of-danger presence data and that a task was carried out in an incorrect procedure in a term Tb on the basis of the procedure appropriateness data. Furthermore, a comparison with the task step data indicates that tasks are delayed in terms Tc and Td. Note that, in a case where a task whose quality is determined to be poor is specified in the good/poor quality data, the display control section 318 may indicate in the actual performance data of FIG. 4 that such a task occurred.

As described above, since the display control section 318 displays the actual performance data and/or the like on the display device 4, the manager can ascertain progress of the task and the task state in real time. Further, in a case where it is determined that the task state is not appropriate, the manager can also instruct or coach the worker while viewing the captured image obtained by the image obtaining section 311. The manager can also view a captured image in which a dangerous task appears, in a case where it is determined that the safety is not ensured.

When the tasks for one day have been completed, the display control section 318 can cause the display device 4 to display actual performance data for the one day in the form of an actual performance progress chart as illustrated in FIG. 4. The display control section 318 displays the actual performance data for the one day together with the task step data, so that a delayed task and a term of the delayed task can be displayed. The display control section 318 can also display, together with the actual performance data for the one day, a term in which a dangerous task occurred, a term in which a task in an incorrect procedure occurred, and a term in which a poor-quality task occurred.

Further, the display control section 318 may display, apart from the actual performance data, the procedure appropriateness data, the occurrence-of-danger presence data and the good/poor quality data. In this case, the display control section 318 may display the procedure appropriateness data, the occurrence-of-danger presence data, and the good/poor quality data in table forms, for example, the procedure appropriateness data in a task procedure table, the dangerous occurrence presence data in a dangerous task table, and the good/poor quality data in a quality control table. In this case, the display control section 318 can notify the manager or the worker of a task that has been carried out in an incorrect procedure, a task in which a dangerous task occurred, and a task in which the quality is poor.

Note that the data creating section 316 does not need to create all of the procedure appropriateness data, the occurrence-of-danger presence data, and the good/poor quality data. The data creating section 316 may create at least one of the procedure appropriateness data, the occurrence-of-danger presence data, and the good/poor quality data. The display control section 318 just have to display only data that is created by the data creating section 316.

The second outputting section 317 inputs the actual performance data for one day that has been created by the data creating section 316, to the task inference model 322 that is stored in the storage section 32. The task inference model 322 is a trained model that is constructed, by machine learning, so as to infer, from actual task performance in an entire task time period for one specific day, a task that is to be carried out in an entire task time period on the next day.

The task inference model 322 is a trained model that is constructed to output task schedule data that indicates a relation between (a) at least one task inferred, as a result of input of actual performance data for one day, to be carried out in the entire task time period on the next day and (b) a term in which the task is to be carried out. The task inference model 322 can be, for example, a neural network (e.g., CNN) that includes at least an input layer, an intermediate layer, and an output layer.

In the task inference model 322, the input layer is a layer into which actual performance data for one day is inputted. The intermediate layer may be a layer in which parameters have been learned on the basis of past task schedule data, past actual performance data, and factor data. The past task schedule data is data that indicates a relation between (a) at least one task that was indicated as a task scheduled to be carried out in an execution plan of past waterworks construction and (b) a term in which the task was to be carried out. The past actual performance data is data that indicates a relation between (a) at least one task that was carried out in the past waterworks construction and (ii) a term in which the task was carried out. The factor data is data that influenced a task in the past waterworks construction. Further, the task interference model 322 causes the computer to function to output, from the output layer, the task schedule data via an operation performed by the intermediate layer, in a case where the actual performance data for one day is inputted into the input layer. That is, the second outputting section 317 outputs the task schedule data by inputting the actual performance data to the task inference model 322.

For example, a plurality of pieces of past task schedule data, a plurality of pieces of past actual performance data, and a plurality of pieces of factor data which are described above are prepared as training data. Examples of information that is included in the factor data include the following information.

(1) Information that indicates daytime or night.

(2) Weather information (e.g., information that indicates sunny, cloudy, rainy, foggy, or the like).

(3) Groove information (e.g., information that indicates groove width, groove depth, earth cover, offset value (distance from a sidewalk to the position where the pipe is to be laid), whether spring water is present or not, or the like).

(4) Soil information (e.g., information that indicates hardness of soil, whether or not generated soil is used (whether or not excavated soil is used for backfilling), the thickness of asphalt pavement, or the like).

(5) Road information (e.g., information that indicates the number of lanes, presence or absence of a sidewalk, inclination angle, presence or absence of road closure, width of a work zone, or the like).

(6) Pipe information (e.g., information that indicates the type of a pipe, nominal diameter, the number of straight or deformed pipes, the line shape of a pipe, presence or absence of a buried object, a position of the buried object, whether or not the buried object should be removed, or the like).

(7) Information on a work machine(s) (e.g., information that indicates model, hauling power, the number of machines, model number of the bucket, or the like).

(8) Information on the content of a task (e.g., information that indicates actual performance of manual excavation or excavation with use of a backhoe, actual performance of a task other than excavation, or the like).

(9) Tool information (e.g., information indicating the model number of a lever hoist, or the like).

(10) Worker information (e.g., information that indicates the number of persons, age, gender, the number of years of task experience, or the like).

(11) Information on a surrounding environment (information that indicates a positional relation between a material storage site and the construction site, or the like).

The past actual performance data may include, for example, information that indicates an actual value of a past task time period in waterworks construction which was carried out by a specific contractor that carries out a task subject to inference. Further, the past actual performance data may include information that indicates actual values of past task time periods in past waterworks construction which were domestically carried out by contractors other than the specific contractor. Meanwhile, the factor data may include actual performance of an incorrect task procedure, actual performance of a dangerous task, and a result of analysis of an occurrence factor of the dangerous task (information based on past accident cases), each of which occurred in the above-described cases of waterworks construction. Examples of the result of the analysis include, in a case where sling belts are analyzed, information on the number of sling belts, a hook angle, and an attachment position with respect to the pipe.

The past task schedule data may be, for example, task schedule data that includes a task procedure which is indicated as a schedule to be carried out in a past execution plan in waterworks construction by the specific contractor.

Note that the intermediate layer of the task inference model 322 may be a layer in which parameters have been learned further on the basis of task change relation data and past percentage-of-completion data as training data. The task change relation data indicates a relation between a result of change in the order of task steps and a change in task time period before and after the change in the order of the task steps, in a case where the order of the task steps was changed in past waterworks construction. That is, the task change relation data indicates how the task time period changed (e.g., how much the task time period could be reduced) as a result of readjustment of the order of the task steps. The past percentage-of-completion data is associated with past actual performance data and indicates a ratio of completion (percentage of completion) of a task(s) in a predetermined task time period with respect to all tasks of the past waterworks construction. The ratio of completion can also be referred to as "achievement rate".

In this case, the intermediate layer of the task inference model 322 executes the following inference process as a part of the above-described operation, in a case where actual performance data for one day is inputted into the input layer. That is, the intermediate layer of the task inference model 322 infers, on the basis of the ratio of completion of the task(s) that is indicated in the past percentage-of-completion data, a ratio of completion of the task(s) that is/are indicated in the actual performance data thus inputted, with respect to all of tasks of waterworks construction. In terms of inference of this ratio of completion, the ratio of completion of the task(s) that is associated with the past actual performance data can be defined as correct answer data.

The intermediate layer infers the order of task steps in the entire task time period on the next day, on the basis of the ratio of completion inferred and the task change relation data. For example, in a case where the ratio of completion inferred is less than a ratio of completion scheduled, the intermediate layer can carry out an operation for creating task schedule data that includes the order of task steps with which the ratio of completion may be improved, in consideration of the relation between the change in the order of task steps and the change in task time period in the past waterworks construction. Note that the above-described "ratio of completion inferred is less than a ratio of completion scheduled" means that the task is behind the schedule.

As described above, the task inference model 322 that is constructed with use of the past percentage-of-completion data and the task change relation data as the training data can output task schedule data in which the task(s) for the next day is/are readjusted in accordance with progress of the task(s) for one specific day.

Note that from the above-described past actual performance data, only data in which the ratio of completion is equal to or greater than a predetermined threshold value may be used as the training data. In this case, since the past actual performance data having a low ratio of completion is not used as the training data, the task inference model 322 can output task schedule data in which a decrease in ratio of completion is reduced. Therefore, in this case, the task inference model 322 can output more reliable task schedule data.

The second outputting section 317 may specify, in the task schedule data, a task for which it is inferred, by inputting the procedure appropriateness data to the task inference model 322, that an error may occur in the task procedure in the entire task time period on the next day. Moreover, the second outputting section 317 may specify, in the task schedule data, a task for which it is inferred, by inputting the occurrence-of-danger presence data to the task inference model 322, that a dangerous task may occur in the task procedure in the entire task time period on the next day. Further, the second outputting section 317 may specify, in the task schedule data, a task for which it is inferred, by inputting the good/poor quality data to the task inference model 322, that the quality is poor in the entire task time period on the next day.

For example, in a case where in the task schedule data, there is a task that is the same as a task which is in the task procedure appropriateness data and for which it is specified that an error occurred, the task inference model 322 identifies the task in the task schedule data. Similarly, in a case where in the task schedule data, there is a task that is the same as a task which is in the occurrence-of-danger presence data and for which it is specified that a dangerous task occurred, the task inference model 322 identifies the task in the task schedule data. Further, in a case where in the task schedule data, there is a task that is the same as a task which is in the good/poor quality data and for which it is specified that the quality is poor, the task inference model 322 identifies the task in the task schedule data.

The display control section 318 may cause the display device 4 to display, for example, the task schedule data that has been outputted by the second outputting section 317. FIG. 5 is a diagram showing a display example of the task schedule data. In the example of FIG. 5, the task schedule data that has been outputted by the second outputting section 317 and that is inferred to be optimal as a task schedule for the next day is displayed in the form of an execution process chart for the next day. The example of FIG. 5 indicates that a dangerous task may occur in a term Tp on the basis of the occurrence-of-danger presence data and that an error in a task procedure may occur in a term Tq on the basis of the procedure appropriateness data. Further, in the example of FIG. 5, it is indicated that the quality may be poor in a term Tr on the basis of the good/poor quality data.

Note that the display control section 318 may display, separately from the task schedule data, the task for which the second outputting section 317 inferred that a dangerous task may occur, the task for which the second outputting section 317 inferred that an error in the task procedure may occur, and a task for which the second outputting section 317 inferred that the quality may be poor. In this case, it is possible to notify the manager or the worker of these tasks.

Then, as described above, the task schedule data that is the output result of the second outputting section 317 is displayed on the display device 4. The display device 4 thus can function as a proposal device that proposes readjustment of the task schedule for the next day.

<Example of Use of Result of Determination by Task State Determining Section>

FIG. 6 is a diagram showing an example of a relation between the result of determination by the task state determining section 315 and the content of notification by the display control section 318. The task state determining section 315 outputs, as described above, a result of determination on the task procedure, task quality, safety, and task time period (presence or absence of delay) of each of tasks. As shown in FIG. 6, it is possible to determine the content of notification on the basis of a combination of results of the determination on the task procedure, task quality, safety, and task time period of each of the tasks. Note that in the "task time period" of FIG. 6, "short" indicates that the time period that was necessary for the task is shorter than the time period indicated in the task step data, and "long" indicates that the time period that was necessary for the task is longer than the time period indicated in the task step data. Further, "standard" indicates that the time period that was necessary for the task is substantially equal to the time period indicated in the task step data.

For example, assume a case where, as shown in FIG. 6, the task time period was determined to be shorter than the task schedule for a task for which the task state determining section 315 has determined that the task procedure is appropriate, the task quality is good, and the task is safe. In this case, it is possible to propose to shorten the task time period for the next day and later from a scheduled task time period, and to distribute manpower of workers etc. to another construction site. On the other hand, in a case where it is determined that the task time period is longer than the task schedule, it is possible to propose to lengthen the task time period for the next day and later from the scheduled task time period, and to allocate additional manpower of workers etc.

Further, as shown in FIG. 6, for a task for which the task state determining section 315 has determined that an error occurred in the task procedure and a task for which the task state determining section 315 has determined that the task quality is poor, it is possible to instruct readjustment of the task. Further, regarding a task that the task state determining section 315 has determined to be a dangerous task, it is possible to give a warning to tell that the task is dangerous and also to propose an improvement method. Also in a case where the task state determining section 315 carries out the above determination, it is possible to make a proposal as to the task time period as described above when the task time period is determined to be shorter or longer than the task schedule.

The display control section 318 may cause the display device 4 to display the content of notification in accordance with the result of determination by the task state determining section 315. Also in this case, it is possible to cause the display device 4 to function as a proposal device that proposes readjustment of a task schedule for the next day. For example, the display control section 318 may cause the display device 4 to display, as the improvement method, an improvement method that is associated with each of dangerous tasks. Further, the second outputting section 317 outputs the task schedule data and the like, as a result of inputting the actual performance data and the like to the task inference model 322. Therefore, the display control section 318 may propose to shorten or lengthen the task time period by displaying task schedule data that reflects a longer/shorter task time period for that day and that is outputted by the second outputting section 317. Further, the display control section 318 may give a warning regarding the dangerous task by displaying task schedule data that specifies the dangerous task and that is outputted by the second outputting section 317. Note that the display control section 318 may cause the display device 4 to display the content of notification in real time at a time point at which the result of determination by the task state determining section 315 is obtained.

<Example of Output from Second Outputting Section>

For example, on the basis of the actual performance of the incorrect task and the result of analysis of the occurrence factor of the dangerous task which are described above, and a captured image obtained at the time when the dangerous task occurred, the second outputting section 317 may create a dangerous task list that includes the captured image. This dangerous task list can be used to assist creation of a safety management report. Further, the second outputting section 317 may create task procedure data (task procedure document) on the basis of the past actual performance data, the actual performance of the incorrect task procedure, the actual performance of the dangerous task, and the result of analysis of the occurrence factor of the dangerous task, which are described above. The second outputting section 317 may create the task procedure data, for example, in a format that allows reference to a past task procedure.

Further, the task inference model 322 only needs to be constructed to infer, from actual performance of a task in a predetermined task time period, a task to be carried out in a next predetermined task time period. For example, the task inference model 322 may output the task schedule data that is not limited to data for the next day but that can be data for the day after the next day or later. Further, the task inference model 322 may receive input of the actual performance data up to the time point at which the captured image is obtained, and may output task schedule data for later than the time point.

Further, it is only necessary to input, to the task inference model 322, at least one, rather than all, of the procedure appropriateness data, the occurrence-of-danger presence data, and the good/poor quality data. In other words, the second outputting section 317 should output at least one of respective tasks for which the second outputting section 317 inferred that a dangerous task may occur, an error in task procedure may occur, and the quality may be poor. The display control section 318 should display only the task that the second outputting section 317 outputted.

[Processing in Task Management Device]

FIG. 7 is a flowchart showing an example of a process (task management method) in the task management device 3. As shown in FIG. 7, the image obtaining section 311 obtains a captured image from the camera 2 (S1: image obtaining step). The first outputting section 312 inputs, to the index inference model 321, the captured image that has been obtained by the image obtaining section 311 (S2). The first outputting section 312 outputs inferred detection classes as the output result of the index inference model 321 (S3: Outputting step, first outputting step).

The position identifying section 313 infers, in the captured image, respective positions of the detection classes that have been outputted by the first outputting section 312 (S4). The task inferring section 314 infers, by analyzing combinations of detection classes that the first outputting section 312 outputted over time, a task that is being carried out at each of the positions of the detection classes that are identified by the position identifying section 313 and at a time point at which the captured image is obtained (i.e., the task that is presently being carried out) (S5: task inferring step). In a case where the task inferring section 314 determines, on the basis of the positions of the detection classes, that the captured image includes respective scenes in each of which waterworks construction is being carried out, the task inferring section 314 infers the task that is being carried out in the waterworks construction in each of the scenes.

The task state determining section 315 determines a task state of the task inferred by the task inferring section 314, by analyzing the combinations of the detection classes that the first outputting section 312 outputted over time (S6). The display control section 318 causes the display device 4 to display the result of determination, which is made by the task state determining section 315, on the task state (S7).

Further, the data creating section 316 creates, by analyzing the combinations of the detection classes that the first outputting section 312 outputted over time, actual performance data (actual performance progress chart) up to the time point at which the captured image was most recently obtained (S8). The display control section 318 displays, on the display device 4 in real time, the actual performance data created by the data creating section 316 (S9). Note that in S8, the data creating section 316 may create procedure appropriateness data (e.g., task procedure table), occurrence-of-danger presence data (e.g., dangerous task table), and good/poor quality data (e.g., quality control table) up to the time point at which the captured image was most recently obtained. In this case, the display control section 318 may display the procedure appropriateness data, the occurrence-of-danger presence data, and the good/poor quality data on the display device 4.

The control section 31 determines whether or not tasks for one day have been completed (S10). The control section 31 may determine that the tasks for the one day have been completed, for example, in a case where transmission of the captured image from the camera 2 ceases for a predetermined time period or in a case where a user input is received.

In a case where the control section 31 determines that the tasks for the one day have been completed (YES in S10), the data creating section 316 creates actual performance data for the one day (e.g., execution process chart) (S11: data creating step). The second outputting section 317 inputs, to the task inference model 322, the actual performance data for the one day that has been created by the data creating section 316 (S12). The second outputting section 317 outputs, as an output result of the task inference model 322, task schedule data for a next day in which (i) tasks to be carried out on the next day and (ii) respective terms in which the tasks are to be carried out are inferred (S13: second outputting step). The display control section 318 causes the display device 4 to display the task schedule data for the next day which has been outputted by the second outputting section 317 (S14). On the other hand, in a case where the control section 31 determines that the tasks for the one day have not been completed (NO in S10), the process returns to S1.

Note that in S11, the data creating section 316 may create procedure appropriateness data (e.g., task procedure table), occurrence-of-danger presence data (e.g., dangerous task table), and good/poor quality data (e.g., quality control table) each for the one day. In this case, the second outputting section 317 may specify, in the task schedule data by inputting the above data to the task inference model 322, a task for which it is inferred that an error may occur in a task procedure, a task for which it is inferred that a dangerous task may occur, and a task for which it is inferred that the quality is poor. The display control section 318 may display, on the display device 4, the task schedule data in which the above tasks are specified. Note that the display control section 318 may display, on the display device 4, the tasks that have been inferred by the task inference model 322 separately from the task schedule data.

The display control section 318 may display, on the display device 4, the actual performance data, the procedure appropriateness data, the occurrence-of-danger presence data, and the good/poor quality data each for the one day, which have been created in step S11.

(Modification of Task Management Device)

In the present embodiment, the task management device 3 has been described to output the task schedule data while outputting the result of determination of the task state. However, the task management device 3 may have only a first function of outputting the result of determination of the task state or only a second function of the outputting the task schedule data.

The task management device 3 realizing the first function only needs to include the image obtaining section 311, the first outputting section 312 that outputs a detection class that is inferred by the index inference model 321, and the task inferring section 314 that infers a task presently being carried out on the basis of the detection class.

Further, the task management device 3 realizing the second function only needs to include the following components in addition to the image obtaining section 311 and the first outputting section 312. That is, the task management device 3 only needs to include the data creating section 316 that creates actual performance data by analyzing a detection class which has been outputted by the first outputting section 312, and the second outputting section 317 that outputs the task schedule data by inputting the actual performance data to the task inference model 322.

(Major Effects)

(1) The task management device 3 having the first function can automatically infer a task that is presently being carried out only by obtaining a captured image. Therefore, a manager or a worker can easily manage the task that is presently being carried out.

There is uncertainty (e.g., a scheduled task is changed suddenly on the day) in waterworks construction. However, the task management device 3 allows the manager or the worker to manage the task that is presently being carried out, so that it is possible to also ascertain the task that has suddenly been changed.

The task management device 3 only needs to be capable of obtaining a captured image from the camera 2, and it is not always necessary to be installed at a site of waterworks construction or to be realized by an electronic device that the worker owns. The same applies to the display device 4 that displays the output result of the task management device 3. Therefore, the manager, such as a task master, of the site, who manages the waterworks construction, can remotely ascertain the task that is presently being carried out and that is inferred by the task management device 3, even in a case where the manager is not at the site.

The task management device 3 further includes the task state determining section 315 that determines, by analyzing the detection class(es), whether or not the task state inferred is appropriate. Therefore, the manager or the worker can ascertain whether or not the present task state is appropriate. In daily waterworks construction, management items (e.g., appropriateness of the task procedure, whether or not the task quality is good or poor, safety, and the presence or absence of a delay in the task time period) to be managed by the manager vary widely. Since the task management device 3 determines whether or not the task state that is indicated by each of the management items is appropriate, the manager or the worker can easily manage a plurality of management items.

In addition, in waterworks construction, labor and experience are required for checking progress of daily tasks and checking the contents of the tasks (e.g., checking safety). The task management device 3 can infer the task being carried out and the appropriateness of the task state of the task, only by obtaining the captured image. Therefore, the manager or the worker can easily check of the progress of the daily tasks and the contents of the tasks without relying on experience of the manager or the worker.

Further, by obtaining the captured image from each of a plurality of waterworks construction sites, the task management device 3 can infer, for each of the plurality of construction sites, a task being carried out and whether or not the task state of the task is appropriate. It is considered that in the future, in more cases, one manager simultaneously manages a plurality of construction sites due to personnel shortage. However, the task management device 3 allows the manager or a worker to easily and simultaneously manage the task being carried out at each of the plurality of construction sites and the appropriateness of the task state of the task.

(2) The task management device 3 having the second function automatically creates task schedule data for the next day only by obtaining a captured image. Therefore, the task management device 3 can easily increase the possibility of causing the task for the next day to progress as scheduled.

In addition, in waterworks constructions, labor and experience are also required for readjustment of the execution process chart in accordance with a task situation. Since the task management device 3 automatically outputs the task schedule data for the next day only by obtaining a captured image, the manager can easily improve task efficiency without relying on experience of the manager.

Aspects of Present Disclosure

In order to solve the above problem, a task management device in accordance with an aspect of the present invention includes: an image obtaining section configured to obtain a captured image that includes a task target region in waterworks construction; a first outputting section configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; and a task inferring section configured to infer, on the basis of an output result from the first outputting section, a task being carried out at the time point at which the captured image is obtained.

In order to solve the above problem, a task management method in accordance with an aspect of the present invention includes: an image obtaining step of obtaining a captured image that includes a task target region in waterworks construction; an outputting step of outputting at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; and a task inferring step of inferring, on the basis of an output result in the outputting step, a task being carried out at the time point at which the captured image is obtained.

According to the above-described configuration, a combination of indices at the time point at which the captured image is obtained can be inferred by inputting the captured image to the index inference model. Therefore, it is possible to infer a task being carried out at the time point at which the captured image is obtained, on the basis of the combination of the indices inferred. Therefore, a person involved in the waterworks construction can manage the task being carried out.

The task management device according to an aspect of the present invention may be configured such that the task inferring section infers the task that was being carried out at the time point at which the image obtaining section most recently obtained the captured image, by analyzing combinations of indices that the first outputting section outputted over time, the combinations appearing at respective time points at each of which the captured image was obtained.

According to the above configuration, it is possible to infer a task that is presently being carried out by analyzing the combinations of indices that are inferred from present and most recent past captured images.

The task management device according to an aspect of the present invention may be configured to further include a task state determining section configured to determine whether or not the task state of the task inferred by the task inferring section is appropriate, by analyzing combinations of indices that the first outputting section outputted over time, the combinations appearing at respective time points at each of which the captured image was obtained.

According to the above-described configuration, it is possible to determine whether or not a present task state is appropriate by analyzing the combinations of indices that are inferred from the present and most recent past captured images. Therefore, a person involved in the waterworks construction can ascertain appropriateness of the present task state.

The task management device according to an aspect of the present invention may be configured such that the task state determining section determines, as to whether or not the task state is appropriate, at least one of (i) whether or not a task procedure is appropriate, (ii) whether or not safety is ensured, and (iii) whether or not the task is delayed.

According to the above-described configuration, it is possible to determine, as the present task state, (i) whether or not the task procedure is appropriate, (ii) whether or not the safety is ensured, and/or (iii) whether or not the task is delayed. Therefore, a person involved in the waterworks construction can ascertain appropriateness of the task procedure, the safety, and/or progress of the task.

The task management device according to an aspect of the present invention may be configured to further include a warning section configured to warn a person involved in the waterworks construction, in a case where the task state determining section has determined that the task state is not appropriate.

According to the above-described configuration, it is possible to warn a person involved in the waterworks construction that the present task state is in an unfavorable state.

The task management device according to an aspect of the present invention may be configured to further include a position identifying section configured to identify, in the captured image, a position of an index that has been outputted by the first outputting section, in a case where the waterworks construction is carried out in each of different regions in the captured image, the task inferring section inferring, on the basis of the position of the index identified by the position identifying section, a task being carried out in each of the different regions.

According to the above configuration, in a case where scenes in which a plurality of tasks are carried out are included in the captured image, each of the plurality of tasks can be inferred from the captured image.

The task management device according to an aspect of the present invention may be configured to further include a data creating section configured to create actual performance data that indicates a relation between at least one task carried out in a predetermined task time period and a term in which the task was carried out, by analyzing combinations of indices that the first outputting section outputted over time, the combinations appearing at respective time points at each of which the captured image was obtained within the predetermined task time period.

According to the above-described configuration, a user can ascertain actual performance (progress) of the task(s) that was/were carried out in a predetermined task time period (e.g., task time period (e.g., 8:00 to 16:30) that is specified per day).

The task management device according to an aspect of the present invention may be configured such that the data creating section creates at least one of (i) procedure appropriateness data that indicates whether or not a task procedure in the predetermined task time period is appropriate and (ii)

occurrence-of-danger presence data that indicates the presence or absence of occurrence of a dangerous task in the predetermined task time period, by analyzing combinations of indices that the first outputting section outputted over time, the combinations appearing at respective time points at each of which the captured image was obtained within the predetermined task time period.

According to the above-described configuration, a person involved in the waterworks construction can ascertain appropriateness of the task procedure and/or the presence or absence of the occurrence of a dangerous task in the task carried out in the predetermined task time period.

In order to solve the above problem, a task management device in accordance with an aspect of the present invention includes: an image obtaining section configured to obtain a captured image that includes a task target region in waterworks construction; a first outputting section configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; a data creating section configured to create actual performance data that indicates a relation between at least one task carried out in a predetermined task time period and a term in which the task was carried out, by analyzing combinations of indices that the first outputting section outputted over time, the combinations appearing at respective time points at each of which the captured image was obtained within the predetermined task time period; and a second outputting section configured to output task schedule data that indicates a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period.

In order to solve the above problem, a task management method in accordance with an aspect of the present invention includes: an image obtaining step of obtaining a captured image that includes a task target region in waterworks construction; a first outputting step of outputting at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices for evaluating a task state in the waterworks construction; a data creating step of creating actual performance data that indicates a relation between at least one task carried out in a predetermined task time period and a term in which the task was carried out, by analyzing combinations of indices that were outputted over time in the first outputting step, the combinations appearing at respective time points at each of which the captured image was obtained within the predetermined task time period; and a second outputting step of outputting task schedule data that indicates a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period.

According to the above configuration, in consideration of actual performance of a task in a present predetermined task time period, it is possible to create task schedule data in a next predetermined task time period (e.g., task time period (e.g., 8:00 to 16:30) that is specified for the next day). Therefore, it is possible to increase the possibility that the task will progress as scheduled in the next predetermined task time period. Further, it is possible to propose, by outputting the task schedule data, readjustment of a task schedule in the next predetermined task time period.

The task management device according to an aspect of the present invention may be configured such that: the data creating section creates at least one of (i) procedure appropriateness data that indicates whether or not a task procedure in the predetermined task time period is appropriate and (ii) occurrence-of-danger presence data that indicates the presence or absence of occurrence of a dangerous task in the predetermined task time period, by analyzing combinations of indices that the first outputting section outputted over time, the combinations appearing at respective time points at each of which the captured image was obtained within the predetermined task time period; and the second outputting section is configured to: (1) specify, in the task schedule data, a task for which it is inferred, by inputting the procedure appropriateness data to the task inference model, that an error is likely to occur in the task procedure in the next predetermined task time period; (2) specify, in the task schedule data, a task for which it is inferred, by inputting the occurrence-of-danger presence data to the task inference model, that a dangerous task is likely to occur in the next predetermined task time period; or (3) specify, in the task schedule data, both of: the task for which it is inferred in (1) that an error is likely to occur in the task procedure; and the task for which it is inferred in (2) that a dangerous task is likely occur.

According to the above-described configuration, it is possible to reflect, in the task schedule data, the task in which an error may occur in the task procedure in the next predetermined task time period and/or the dangerous task that may occur in the next predetermined task time period. Therefore, a person involved in the waterworks construction can ascertain, in advance by confirming the task schedule data, the task in which an error may occur in the task procedure and/or the dangerous task which may occur.

In order to solve the above problem, an index inference model in accordance with an aspect of the present invention includes: an input layer into which a captured image that includes a task target region in waterworks construction is inputted; an output layer which outputs at least one index among a plurality of indices for evaluating a task state in the waterworks construction; and an intermediate layer in which parameters have been learned on the basis of the index, an image that includes the task target region, and an image that indicates an object in use in the waterworks construction, the index inference model causing a computer to function to output, from the output layer via an operation performed by the intermediate layer, the at least one index that is inferred to appear in a task at a time point at which the captured image is obtained, in a case where the captured image is inputted into the input layer.

According to the above-described configuration, the combination of indices at the time point at which the captured image is obtained can be inferred by inputting the captured image to the index inference model. Therefore, it is possible to infer a task being carried out at the time point at which the captured image is obtained, on the basis of the combination of the indices inferred.

In order to solve the above problem, a task inference model in accordance with an aspect of the present invention includes: an input layer into which actual performance data is inputted, the actual performance data indicating a relation between at least one task carried out in a predetermined task time period and a term in which the task was carried out; an output layer which outputs task schedule data that indicates a relation between at least one task in a next predetermined task time period and a term in which the task is to be carried out; and an intermediate layer in which parameters have been learned on the basis of (i) past task schedule data which indicates a relation between at least one task that was indicated as a task scheduled to be carried out in an execution plan of past waterworks construction and a term in which the task was carried out, (ii) past actual performance data which indicates a relation between at least one task that was carried out in the past waterworks construction and a term in which the task was carried out, and (iii) factor data that influenced the task in the past waterworks construction, the index inference model causing a computer to function to output, from the output layer, the task schedule data via an operation performed by the intermediate layer, in a case where the actual performance data is inputted into the input layer.

According to the above configuration, in consideration of actual performance of a task in the present predetermined task time period, it is possible to create task schedule data in a next predetermined task time period. Therefore, it is possible to increase the possibility that the task will progress as scheduled in the next predetermined task time period. Further, it is possible to propose, by outputting the task schedule data, readjustment of a task schedule in the next predetermined task time period.

The task inference model according to an aspect of the present invention may be configured such that: in the intermediate layer, the parameters have been learned further on the basis of a task change relation data of a case where the order of task steps was changed in the past waterworks construction, the task change relation data indicating a relation between a result of change in the order of the task steps and a change in task time period before and after the change in the order of the task steps, and a past percentage-of-completion data that indicates a percentage of completion of the task in the predetermined task time period with respect to all tasks of the past waterworks construction, the past percentage-of-completion data being associated with the past actual performance data; and the intermediate layer is configured to, in a case where the actual performance data is inputted into the input layer, infer, as a part of the operation, a percentage of completion of the task indicated in the actual performance data with respect to all tasks of waterworks construction, and further infer, as another part of the operation, the order of task steps in the next predetermined task time period, on the basis of the percentage of completion thus inferred and the task change relation data.

According to the above-described configuration, it is possible to output task schedule data in which the task in the next predetermined task time period is readjusted in accordance with the progress of the task in the present predetermined task time period.

Software Implementation Example

Control blocks of the task management device 3 (particularly, the control section 31) can be realized by a logic circuit (hardware) provided in an integrated circuit (IC chip) or the like or can be alternatively realized by software.

In the latter case, the task management device 3 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 3 task management device
311 image obtaining section
312 first outputting section
313 position identifying section
314 task inferring section
315 task state determining section
316 data creating section
318 display control section (warning section)
317 second outputting section
321 index inference model
322 task inference model

The invention claimed is:

1. A task management device comprising:
a processor, the processor carrying out functions of an image obtaining section, a first outputting section, and a task inferring section,
the image obtaining section being configured to obtain a captured image that includes a task target region in waterworks construction,
the first outputting section being configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices that indicate a plurality of respective objects which are involved in tasks in the waterworks construction, or indicate respective combinations thereof,
the task inferring section being configured to infer, on the basis of an output result from the first outputting section and data which is prepared in advance and in which the tasks that can be carried out in the waterworks construction and combinations of the indices are associated with each other, a task being carried out at the time point at which the captured image is obtained,
the index inference model being constructed by machine learning in which an article image that indicates an object to be used in the waterworks construction and the at least one index are used as training data,
the processor further carrying out a function of a position identifying section configured to identify, in a captured image obtained by the image obtaining section, a position of the at least one index outputted by the first outputting section, by inputting the captured image to a position inference model that is constructed so as to infer a position of the at least one index in a captured image, by machine learning with use of training data in which the article image and the at least one index are associated with each other.

2. The task management device according to claim 1, wherein the task inferring section infers the task that was being carried out at the time point at which the image obtaining section obtained the captured image, by analyzing combinations of indices that the first outputting section outputted over time and that appear at respective time points at each of which the captured image was obtained.

3. The task management device according to claim 1, wherein the processor further carries out a function of a task state determining section, and
the task state determining section is configured to determine whether or not the task state of the task inferred by the task inferring section is appropriate, by analyzing combinations of indices that the first outputting section outputted over time and that appear at respective time points at each of which the captured image was obtained.

4. The task management device according to claim 3, wherein the task state determining section determines, as to whether or not the task state is appropriate, at least one of (i) whether or not a task procedure is appropriate, (ii) whether or not safety is ensured, and (iii) whether or not the task is delayed.

5. The task management device according to claim 3, further comprising a warning section configured to warn a person involved in the waterworks construction, in a case where the task state determining section has determined that the task state is not appropriate.

6. The task management device according to claim 1, wherein the position identifying section configured to identify, in the captured image, a position of an index that has been outputted by the first outputting section,
in a case where the waterworks construction is carried out in each of different regions in the captured image, the task inferring section inferring, on the basis of the position of the index identified by the position identifying section, a task being carried out in each of the different regions.

7. The task management device according to claim 1, wherein the processor further carries out a function of a data creating section, and
the data creating section is configured to create actual performance data that indicates a relation between at least one task carried out in a predetermined task time period and a term in which the task was carried out, by analyzing combinations of indices that the first outputting section outputted over time and that appear at respective time points at each of which the captured image was obtained within the predetermined task time period.

8. The task management device according to claim 7, wherein the data creating section creates at least one of (i) procedure appropriateness data that indicates whether or not a task procedure in the predetermined task time period is appropriate and (ii) occurrence-of-danger presence data that indicates the presence or absence of occurrence of a dangerous task in the predetermined task time period, by analyzing combinations of indices that the first outputting section outputted over time and that appear at respective time points at each of which the captured image was obtained within the predetermined task time period, and the dangerous task is a task in which an accident may occur.

9. A task management device comprising
a processor, the processor carrying out functions of an image obtaining section, a first outputting section, a data creating section, and a second outputting section,
the image obtaining section being configured to obtain a captured image that includes a task target region in waterworks construction,
the first outputting section being configured to output at least one index that is inferred to appear in a task at a time point at which the captured image is obtained, the at least one index being inferred by inputting the captured image to an index inference model that is constructed, by machine learning, so as to infer at least one index that appears in a task at a specified time point among a plurality of indices that indicate a plurality of respective objects which are involved in tasks in the waterworks constructions, or indicate respective combinations thereof;
the data creating section being configured to create actual performance data that indicates a relation between at least one task carried out in a predetermined task time period and a term in which the task was carried out, by identifying, on the basis of data which is prepared in advance and in which the tasks that can be carried out in the waterworks construction and combinations of the indices are associated with each other and combinations of indices that the first outputting section outputted over time and that appear at respective time points at each of which the captured image was obtained within the predetermined task time period a task at a time that is included in the respective time points at each of which the captured image was obtained and that is within the predetermined task time period,
the second outputting section being configured to output task schedule data that indicates a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period,
the index inference model being constructed by machine learning in which an article image that indicates an object to be used in the waterworks construction and the at least one index are used as training data,
the task inference model being constructed by machine learning in which (i) past task schedule data indicating a relation between at least one task which was indicated as a task scheduled to be carried out in an execution plan of past waterworks construction and a term in which the at least one task was carried out, (ii) past actual performance data indicating a relation between at least one task which was carried out in the past waterworks construction and a term in which the at least one task was carried out, and fun factor data which influenced a task in the past waterworks construction are used as training data, and the processor further carrying out a function of a position identifying section configured to identify, in a captured image obtained by the image obtaining section, a position of the at least one index outputted by the first outputting section, by inputting the captured image to a position inference model that is constructed so as to infer a position of the at least one index in a captured image, by machine learning with use of training data in which the article image and the at least one index are associated with each other.

10. The task management device according to claim 9, wherein:

the data creating section creates at least one of (i) procedure appropriateness data that indicates whether or not a task procedure in the predetermined task time period is appropriate and (ii) occurrence-of-danger presence data that indicates the presence or absence of occurrence of a dangerous task in the predetermined task time period, by analyzing combinations of indices that the first outputting section outputted over time and that appear at respective time points at each of which the captured image was obtained within the predetermined task time period;

the dangerous task is a task in which an accident may occur; and the second outputting section is configured to:
(1) specify, in the task schedule data, a task for which it is inferred, by inputting the procedure appropriateness data to the task inference model, that an error is likely to occur in the task procedure in the next predetermined task time period;
(2) specify, in the task schedule data, a task for which it is inferred, by inputting the occurrence-of-danger presence data to the task inference model, that a dangerous task is likely to occur in the next predetermined task time period; or
(3) specify, in the task schedule data, both of: the task for which it is inferred in (1) that an error is likely to occur in the task procedure; and the task for which it is inferred in (2) that a dangerous task is likely to occur.

11. A task management method comprising:
an image obtaining step, a outputting step, and a task inferring step which are carried out by a processor, wherein
in the image obtaining step, a captured image that includes a task target region in waterworks construction is obtained
in the outputting step, at least one index that is inferred to appear in a task at a time point at which the captured image is obtained is outputted, the at least one index being inferred by inputting the captured image to an index inference model that is constructed, by machine learning, so as to infer at least one index that appears in a task at a specified time point among a plurality of indices that indicate a plurality of respective objects which are involved in tasks in the waterworks construction, or indicate respective combinations thereof,
in the task inferring step, on the basis of an output result in the outputting step and data which is prepared in advance and in which the tasks that can be carried out in the waterworks construction and combinations of the indices are associated with each other, a task being carried out at the time point at which the captured image is obtained is inferred, the index inference model is constructed by machine learning in which an article image that indicates an object to be used in the waterworks construction and the at least one index are used as training data, and the processor further carries out a function of a position identifying section configured to identify, in a captured image obtained by the image obtaining section, a position of the at least one index outputted in the outputting step, by inputting the captured image to a position inference model that is constructed so as to infer a position of the at least one index in a captured image, by machine learning with use of training data in which the article image and the at least one index are associated with each other.

12. The task management method according to claim 11, wherein the processor further carries out a data creating step and a second outputting step, wherein in the data creating step, actual performance data that indicates a relation between at least one task carried out in a predetermined task time period and a term in which the task was carried out is created, by identifying, on the basis of data which is prepared in advance and in which the tasks that can be carried out in the waterworks construction and combinations of the indices are associated with each other and combinations of indices that were outputted over time in a first outputting step which is the outputting step and that appear at respective time points at each of which the captured image was obtained within the predetermined task time period, a task at a time that is included in the respective time points at each of which the captured image was obtained and that is within the predetermined task time period, in the second outputting step, task schedule data is outputted, the task schedule data indicating a relation between at least one task inferred as a task to be carried out in a next predetermined task time period and a term in which the task is to be carried out, by inputting the actual performance data to a task inference model that is constructed, by machine learning, so as to infer, on the basis of actual performance of the task in the predetermined task time period, the task to be carried out in the next predetermined task time period, and the task inference model is constructed by machine learning in which (i) past task schedule data indicating a relation between at least one task which was indicated as a task scheduled to be carried out in an execution plan of past waterworks construction and a term in which the at least one task was carried out, (ii) past actual performance data indicating a relation between at least one task which was carried out in the past waterworks construction and a term in which the at least one task was carried out, and (iii) factor data which influenced a task in the past waterworks construction are used as training data.

\* \* \* \* \*